US011366227B2

(12) United States Patent
Mody et al.

(10) Patent No.: US 11,366,227 B2
(45) Date of Patent: Jun. 21, 2022

(54) ORTHOGONAL CHIRPS FOR RADAR, RELATIVE NAVIGATION AND RANGING, LIGHT DETECTION AND RANGING, AND COMMUNICATIONS FUNGIBILITY

(71) Applicant: BAE Systems Information and Electronic Systems Integration Inc., Nashua, NH (US)

(72) Inventors: Apurva N. Mody, Chelmsford, MA (US); David J. Couto, Pepperell, MA (US); Prabahan Basu, Lexington, MA (US); Michael J. Shea, Beverly, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 601 days.

(21) Appl. No.: 16/507,832

(22) Filed: Jul. 10, 2019

(65) Prior Publication Data
US 2021/0011156 A1 Jan. 14, 2021

(51) Int. Cl.
*H04J 13/00* (2011.01)
*G01S 17/26* (2020.01)
(Continued)

(52) U.S. Cl.
CPC .......... *G01S 17/26* (2020.01); *G01S 7/52038* (2013.01); *H04B 1/69* (2013.01); *H04B 10/5561* (2013.01);
(Continued)

(58) Field of Classification Search
CPC .......... G01S 7/003; G01S 7/006; G01S 7/484; G01S 7/4861; G01S 7/52038;
(Continued)

(56) References Cited

U.S. PATENT DOCUMENTS 8,406,275 B2 * 3/2013 Sforza ..................... H04L 27/12
375/139
9,791,550 B2 * 10/2017 Mckitterick .............. G01S 7/35
(Continued)

OTHER PUBLICATIONS

Lv et al., A Joint Radar-Communication System based on OCDM-OFDM scheme, IEEE, 3 pages, 2018.*
(Continued)

*Primary Examiner* — Frank Duong
(74) *Attorney, Agent, or Firm* — Finch & Maloney PLLC

(57) ABSTRACT

A multi-user system to simultaneously perform operations such as communication, RADAR, Light Detection and Ranging (LIDAR) and Relative Navigation (RELNAV). The techniques according to an embodiment includes generating a Fourier based orthogonal chirp sequence of length P, a prime number greater than the number of users targeted for communication. The orthogonal chirp sequence is based on an identifier, in the range of one to P−1, associated with one of the targeted users. The method further includes using the orthogonal chirp sequence to generate a spread user signal based on a message directed to the one targeted users. The method further includes generating a sequence of training pulses for insertion into the spread user signal to facilitate reception of the signal. The method further includes transmitting and receiving a reflection of the spread user signal from one of the targeted users, the reflection used to detect and range the user.

21 Claims, 22 Drawing Sheets
(12 of 22 Drawing Sheet(s) Filed in Color)

(51) Int. Cl.
  H04B 10/556 (2013.01)
  H04B 1/69 (2011.01)
  G01S 7/52 (2006.01)
(52) U.S. Cl.
  CPC  *G01S 2205/002* (2013.01); *H04B 2001/6912* (2013.01)
(58) Field of Classification Search
  CPC ........ G01S 13/08; G01S 13/24; G01S 13/282; G01S 13/345; G01S 13/86; G01S 17/26; G01S 2205/002; H03D 3/007; H03D 7/166; H04B 1/10; H04B 1/16; H04B 1/69; H04B 10/5561; H04B 2001/6912; H04L 27/2273; H04L 27/3863; H04L 2027/0067
  See application file for complete search history.

(56) References Cited

U.S. PATENT DOCUMENTS

| | | | | |
|---|---|---|---|---|
| 10,855,328 | B1* | 12/2020 | Gulati | H04J 13/0062 |
| 11,061,126 | B2* | 7/2021 | Ray | H04L 27/3863 |
| 2006/0258296 | A1* | 11/2006 | Steer | H04K 3/822 455/227 |
| 2007/0211786 | A1* | 9/2007 | Shattil | H04L 27/2601 375/147 |
| 2019/0219683 | A1* | 7/2019 | Fang | G01S 7/35 |

OTHER PUBLICATIONS

Cheng et al., Spread Spectrum-Coded OFDM Chirp Waveform Diversity Design, IEEE, 7 pages, Oct. 2015.*
Cheng et al., MIMO OFDM Chirp Waveform Design With Spread Spectrum Modulation, IEEE, 4 pages, 2014.*
Mingyang et al., An Improved OFDM Chirp Waveform Design, IEEE, 5 pages, 2013.*
Nowak et al., "Co-Designed Radar-Communication Using Linear Frequency Modulation Waveform," IEEE A&E Systems Magazine, Oct. 2016, pp. 28-35.
Chuang et al., "Secure Spread Spectrum Communication Using Ultrawideband Random Noise Signals," IEEE Military Communications Conference (MILCOM), 2006, 7 pages.
Chuang et al., "Design, Analysis, and Performance of a Noise Modulated Covert Communication Systems" EURASP Journal on Wireless Communications and Networking, 2008, 12 pages.
Surender et al., "Performance Analysis of Communications & Radar Coexistence Covert UWB OSA Systems," IEEE Global Telecommunications Conference (GLOBECOM), 2010, 5 pages.
Suehiro N and M Hatori, "Modulatable Orthogonal Sequences and their Application to SSMA Systems," IEEE Transactions on Information Theory, Jan. 1988, vol. 34, pp. 93-100.
Li et al., "Fast Adaptive Pulse Compression Based on Matched Filter Outputs," IEEE Transactions on Aerispace and Electronic Systems, Jan. 2015, vol. 51, pp. 548-564.
Somg et al., "Optimization Methods for Designing Sequences with Low Autocorrelation Sidelobes", arXiv:1501.02252v1, Dec. 26, 2014, 12 pages.

* cited by examiner

1600

1710

1720

ORTHOGONAL CHIRPS FOR RADAR, RELATIVE NAVIGATION AND RANGING, LIGHT DETECTION AND RANGING, AND COMMUNICATIONS FUNGIBILITY

STATEMENT OF GOVERNMENT INTEREST

This invention was made with United States Government assistance under Contract No. N66001-16-C-4010 awarded by the Defense Advanced Research Projects Agency (DARPA). The United States Government has certain rights in this invention.

FIELD OF DISCLOSURE

The present disclosure relates to orthogonal chirp waveforms, and more particularly, to the use of orthogonal chirp waveform for multi-user communications, simultaneously with other spectrum bandwidth items such as Radar application for detection and ranging, relative navigation and ranging (RELNAV), and Light Detection and Ranging (LIDAR).

BACKGROUND

Wireless Communications (COMMS), radio frequency detection and ranging (RADAR), relative navigation and ranging (RELNAV), and Light Detection and Ranging (LIDAR) are examples of applications which can consume significant bandwidth in a space where available spectrum is typically constrained. Additionally, for platforms where both communications and ranging/navigation are required, it can be expensive and inefficient to employ separate hardware and transceiver front end circuitry for both the communication system and the ranging/navigation system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
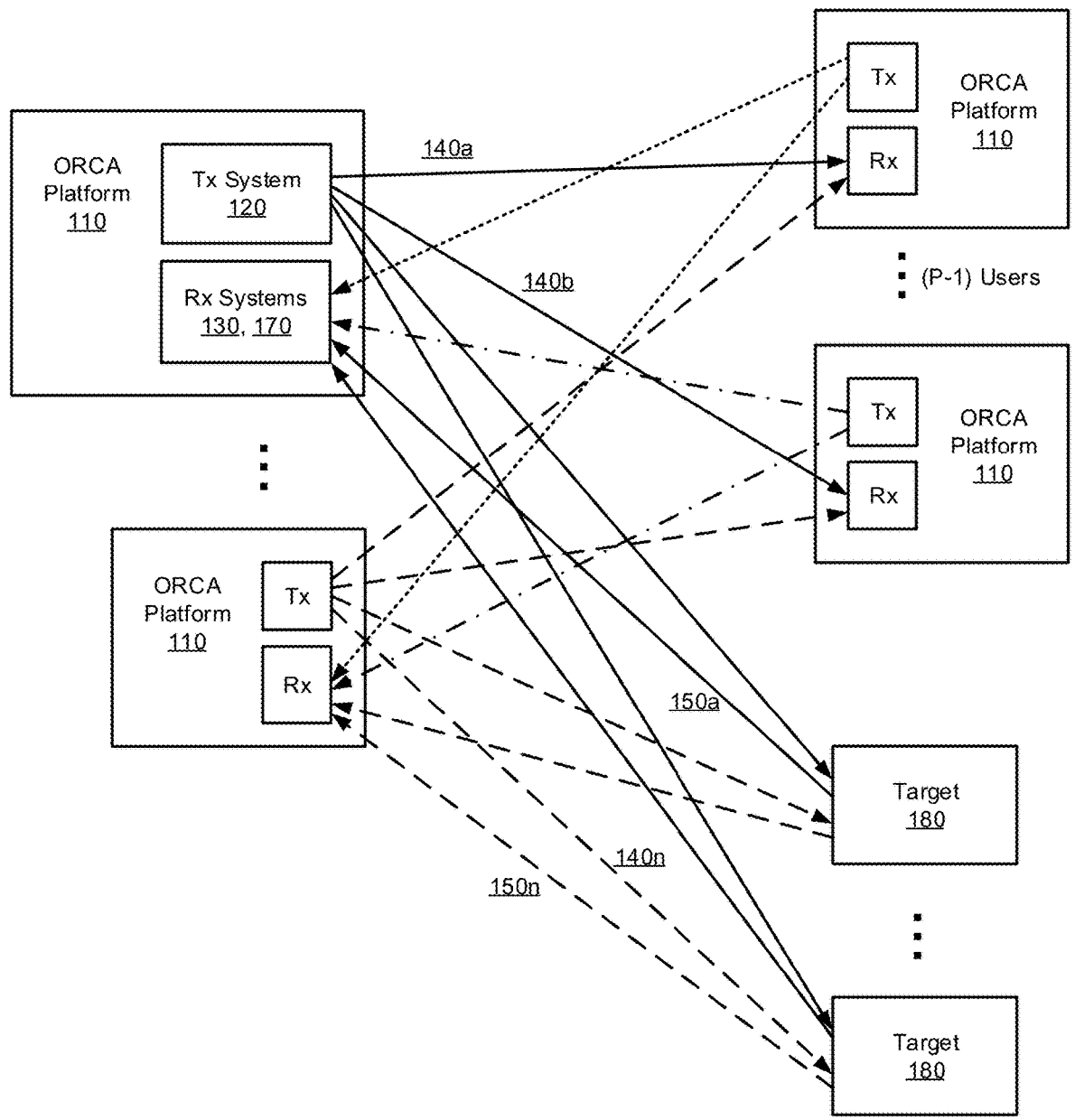
FIG. 1 is a top-level diagram of a multi-user communications system with detection, ranging, and navigation capability, configured in accordance with certain embodiments of the present disclosure.

Although the following Detailed Description will proceed with reference being made to illustrative embodiments, many alternatives, modifications, and variations thereof will be apparent to those skilled in the art.

DETAILED DESCRIPTION

Techniques are provided for efficiently combining multi-user communication capability with detection and ranging functionality, through the use of a dual-purpose spread spectrum signal. The disclosed techniques employ Orthogonal Chirps for Radar, RELNAV, LIDAR and multi-user Comms (ORCA) Fungibility. ORCA is a multi-functional waveform that provides spectrum sharing with the capability to simultaneously perform the operations listed above, using a single platform or multiple platforms, with a single user or multiple users.

The signal is spread by a Fourier based orthogonal chirp sequence that is keyed to each targeted user, as will be described in greater detail below. As previously noted, communication applications and radar applications typically consume significant bandwidth, which is often limited, and generally require separate hardware systems including transmitters and receivers, which is expensive and inefficient. The disclosed techniques employ a spread spectrum signal configured to encode multiple communication messages, each message keyed/targeted to a potentially unique user, with desirable bit error rate properties and reduced interference between users. By assigning different chirps sequences (of the family of chirp sequences) to different users, multiple users share the same time-frequency slots, thus conserving bandwidth. Multi-user demodulation and detection may be performed with relatively simple matched filtering or with more complex techniques where additional gains are required. Additionally, the spread spectrum signal provides desirable auto-correlation and cross-correlation properties which allow for improved detection and ranging of each user platform based on the reflection of the communication signal from that user platform.

In some embodiments, the spread spectrum signal may be transmitted and received as a radar signal, a LIDAR signal, or a signal in any other suitable medium.

Due to the desirable correlation properties of the signals, they may also be used for RELNAV. In the RELNAV application, at least one platform (A) has a known location and performs ranging to another platform (B) based on the orthogonal chirp sequences. The ranging operation is similar to the radar operation. Once platform (A) detects and obtains the distance to platform (B) using these chirp sequences, platform (A) computes the distance of platform (B), with respect to its own location in order to estimate the location of platform (B). The distance is computed based on the following formula:

$$R = \frac{c \cdot \tau}{2}$$

Where the range R is given as a function of c, the velocity of light, and $\tau$, the round trip delay time between the transmission of the pulse and reception of the backscatter from the target. Similarly, velocity, v, of the platform may be estimated as a function of the Doppler frequency ($f_d$) and the transmit frequency of the pulse ($f_T$):

$$v = \frac{c \cdot f_d}{2 \cdot f_T}$$

These equations are applicable in general to Radar and LIDAR systems as well as RELNAV systems.

The disclosed techniques can be implemented, for example, in a communication or computing system or a software product executable or otherwise controllable by such systems, although other embodiments will be apparent.

The system or product is configured to provide multi-user communication with detection and ranging of each user platform. In accordance with an embodiment, a methodology to implement these techniques includes generating a Fourier based orthogonal chirp sequence of length $P^2$ (i.e., P squared), where P is a prime number selected to be greater than the desired number of users that may be targeted for communication. The orthogonal chirp sequence is based on an identification number, in the range of one to P−1, associated with the user to which a message is to be directed or targeted. The method further includes spreading the message by the orthogonal chirp sequence to generate a spread user signal that is encoded for reception by the targeted user. The method further includes generating a sequence of training pulses for insertion into the spread user signal to aid in reception of the spread user signal. The method further includes transmitting the spread user signal, for example as a radar or LIDAR signal), and receiving a reflection of the spread user signal from the targeted user. The method further includes detecting the user platform and calculating a range to the platform based on a timing estimation of a pulse generated by cross-correlation of the spread user signal with the received reflection of the spread user signal. There are many such chirp-like orthogonal sequences that may be used. These include the use of Orthogonal Spreading Codes (e. g. Walsh Codes), Low Correlation Codes (e. g. Gold Codes), Zadoff Chu or Suehiro chirp sequences, and Frank Sequences with Digital Modulation Data riding on top of these signals. Such sequences have an added advantage since these sequences are orthogonal for various circular shifts. Also, these sequences have Complex Amplitude Zero Autocorrelation Waveform (CA-ZAC) properties.

It will be appreciated that the techniques described herein may provide more efficient bandwidth utilization and reduced hardware complexity, compared to existing techniques that require separate communication and radar systems which employ different communication signals and radar signals. The disclosed techniques can be implemented on a broad range of platforms including automobiles (and similar vehicles), aircraft, watercraft, Internet of Things (IoT) devices, portable computer systems, radios, and so forth. Other applications will be apparent. These techniques may further be implemented in hardware or software or a combination thereof.

FIG. 1 is a top-level diagram 100 of a multi-user communications system with some form of detection and ranging capability, configured in accordance with certain embodiments of the present disclosure. One or more ORCA platforms 110 are shown to send communication signals (with ranging and detection capability) 140a, . . . 140n to one or more other ORCA platforms 110 or targets 180. As used herein, targets 180 refer to platforms that are not communicating using the ORCA waveform, but which can nonetheless be detected by the ORCA waveform that is transmitted from one of the ORCA platforms. The communication signals in one example include RADAR signals, LIDAR, RELNAV signals, or signals in any other suitable medium. ORCA platforms 110 are shown to include a transmission system 120 configured to encode communication signals 140a, . . . 140n with an orthogonal chirp sequence spreading code that is keyed to the intended recipient user (e.g., other platforms 110), as will be explained in greater detail below. ORCA platforms 110 are also shown to include a receiver system 170 configured to decode the message that is targeted to that user and a receiver system 130 configured to receive a reflection signal 150a, . . . 150n of the communication signal 140 reflected from one or more of the targets 180. Receiver system 130 is further configured to perform detection and ranging of the platforms 110 and targets 180 based on the reflected signals.

In general, any number of platforms may be configured as ORCA platforms, targets, or a combination of both. For example, in an intelligent vehicle application, each vehicle may be configured as an ORCA platform and/or a target so that each vehicle can determine the relative position of all other vehicles around it, and also perform bidirectional communication with those surrounding vehicles to coordinate activity in a safe and efficient manner, while conserving spectrum bandwidth by reusing the communication signal as a detection and ranging signal.

Figure 2:
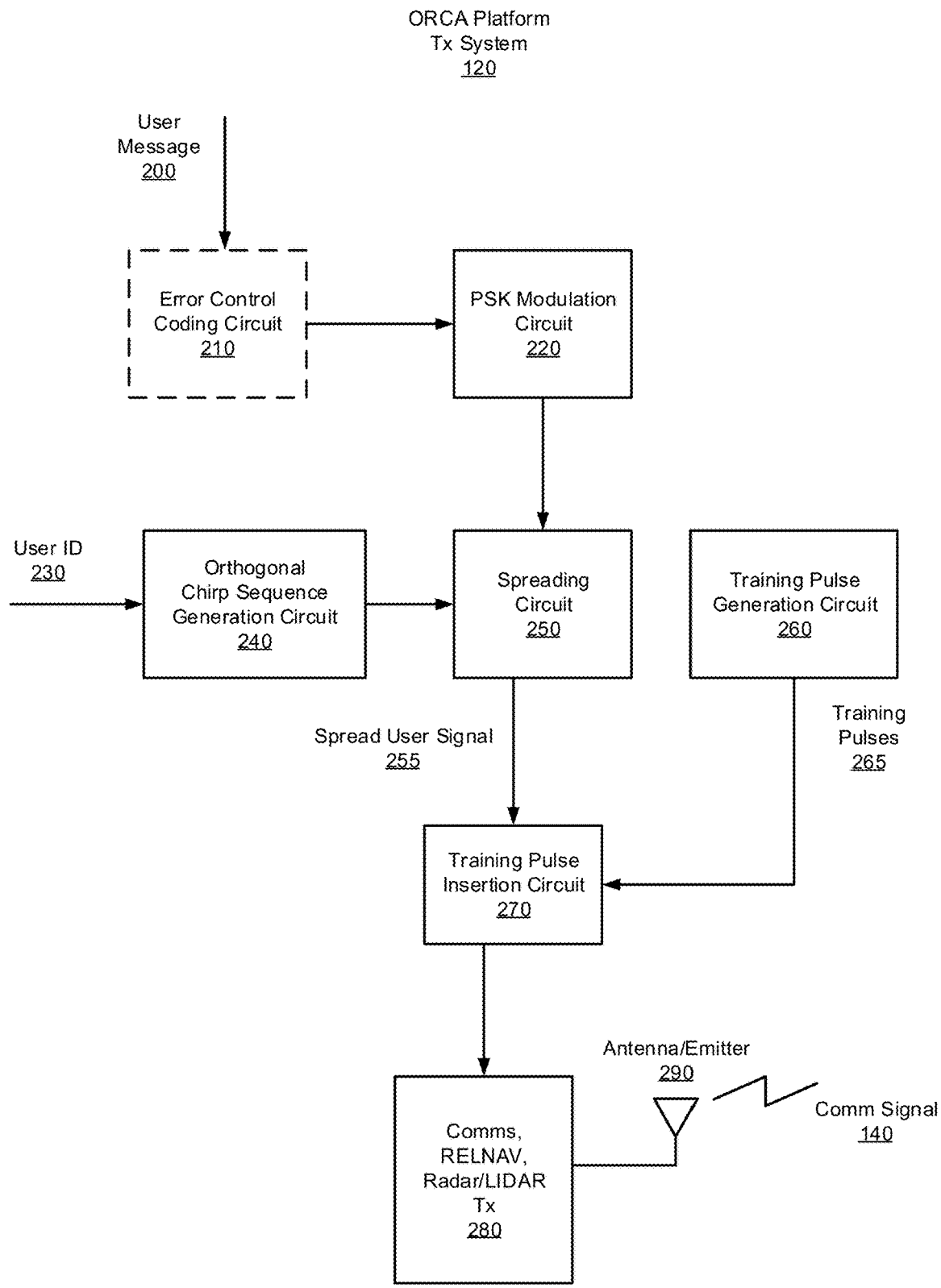
FIG. 2 is a block diagram of an ORCA platform transmission system, configured in accordance with certain embodiments of the present disclosure.

FIG. 2 is a block diagram of an ORCA platform transmission system 120, configured in accordance with certain embodiments of the present disclosure. The ORCA platform transmission system 120 is shown to include an (optional) error control coding circuit 210, a modulation circuit 220, an orthogonal chirp sequence generation circuit 240, a spreading circuit 250, a training pulse generation circuit 260, a training pulse insertion circuit 270, a comms, RELNAV, radar/LIDAR transmitter 280, and an antenna/emitter 290.

The error control coding circuit 210 is configured to perform convolutional coding and/or Reed-Solomon coding on the user message 200 to improve communication performance (e.g., bit error rate). In some embodiments, the convolutional coding may be an inner coding, for example using a ½ rate convolutional code. In some embodiments, the Reed-Solomon (RS) coding may be an outer coding, for example using an RS [255, 235] code. Further in some other embodiments, Low Density Parity Check (LDPC) codes may be employed. In some other embodiments, Turbo Codes may be employed.

The modulation circuit 220 is configured to modulate the message using any suitable modulation technique. In some embodiments, the modulation may be phase shift keying (PSK) modulation, such as quadrature PSK (QPSK) or other constant modulus phase shift keying (M-PSK), where M defines the number of symbols in the alphabet. The Number K, where $M=2^K$ defines the number of bits per symbol that are transmitted.

The orthogonal chirp sequence generation circuit 240 is configured to generate a Fourier based orthogonal chirp sequence of length $P^2$, wherein P is a prime number selected to be greater than the desired number of users targeted for communication. The orthogonal chirp sequence is based on a user identification number 230, in the range of one to P−1, of one of the targeted users.

The spreading circuit 250 is configured to perform spreading of the modulated message by the orthogonal chirp sequence. The spreading process generates a spread user signal 255 which is directed to (e.g., encoded for) the targeted user (e.g., another ORCA platform 110) with the user ID 230. In some embodiments, spread user signal 255 may be expressed as $S_q$ by the following equation:

$$S_q(i_0, i_1) = d_q(i_1)\frac{1}{\sqrt{P}}\exp\left(\frac{j2\pi q i_0 i_1}{P}\right)$$

where $d_q(i_1)$ is the modulated symbol derived from some alphabet such as Quadrature Amplitude Shift Keying (e.g. +1+j, +1−j, −1−j, −1+j) or M-ary Phase Shift Keying, indexed by $i_1$ ($i_1$ in the range of zero to P−1), q is the user ID 230 (in the range of one to P−1), and $i_0$ is the index of the spreading chip (in the range of zero to P−1). These chirp sequences exhibit a spreading gain of $10 \log_{10}(P^2)$, and can tolerate multi-user interference of $10 \log_{10}(P)$ for the case where relatively simple matched filtering techniques are used. Additionally, the constant modulus waveforms generated by these chirp sequences provides power amplifier efficiency benefits. A further advantage of using orthogonal chirp sequences as spreading sequences is that chip level synchronization is not required due to circularly shift orthogonality.

The training pulse generation circuit 260 is configured to generate a sequence of training pulses 265 for insertion into the spread user signal 255 to aid in the reception of the spread user signal, as will be described in greater detail below. The training pulses 265 are inserted into spread user signal 255, for example between messages, by training pulse insertion circuit 270.

The Comms/radar/LIDAR/RELNAV transmitter 280 is configured to transmit the spread user signal (including training pulses), through antenna/emitter 290 as communication signal 140 in the form of radar, LIDAR, or any other suitable signal medium.

Figure 3:
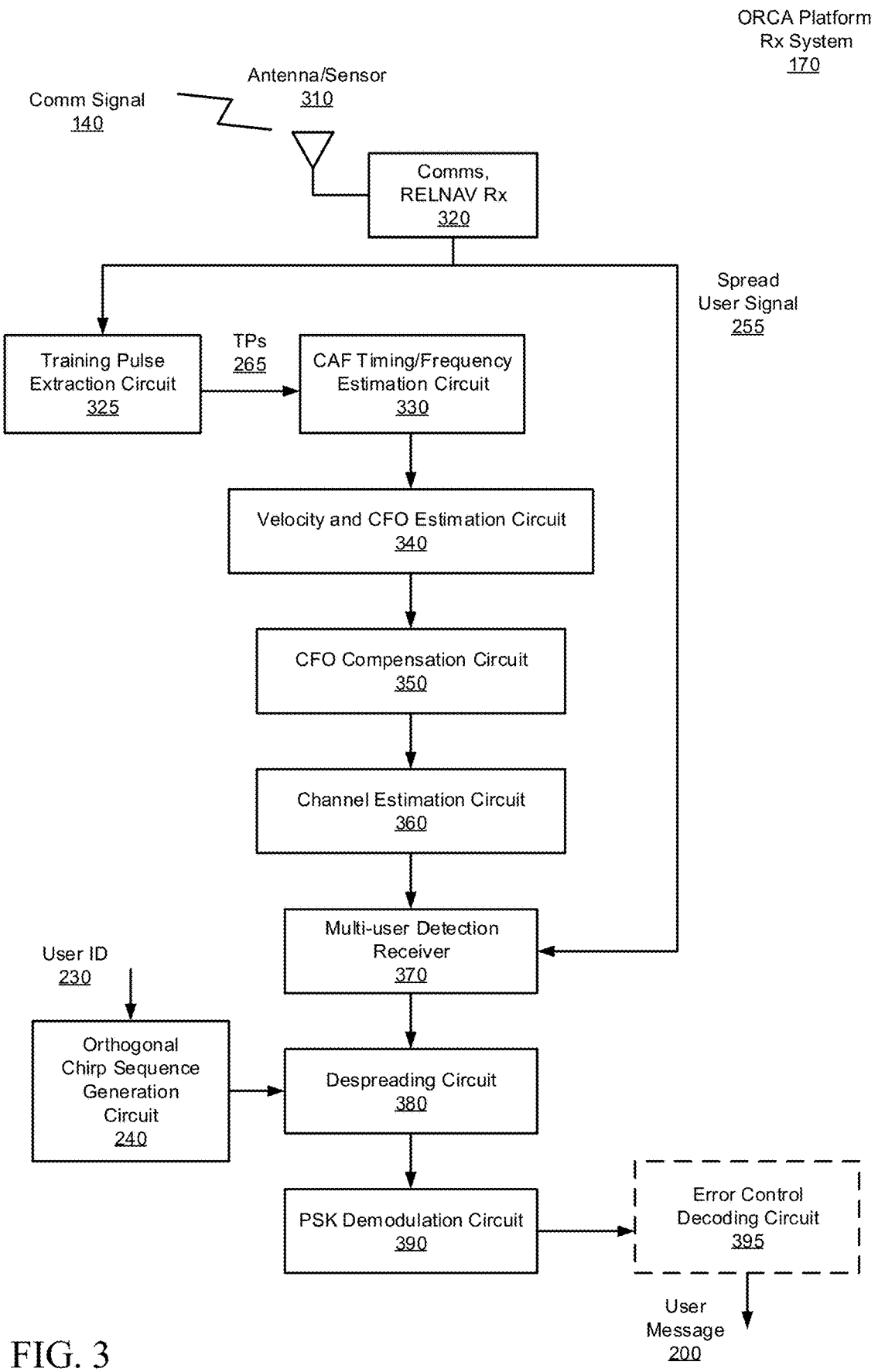
FIG. 3 is a block diagram of a user platform receiver system, configured in accordance with certain embodiments of the present disclosure.

FIG. 3 is a block diagram of an ORCA platform receiver system 170, configured in accordance with certain embodiments of the present disclosure. The ORCA platform receiver system 170 is shown to include an antenna/sensor 310, a radar/LIDAR receiver 320, a training pulse extraction circuit 325, a Cross Ambiguity Function (CAF) timing estimation circuit 330, a velocity and carrier frequency offset (CFO) estimation circuit 340, a CFO removal circuit 350, a channel estimation circuit 360, a RAKE receiver 370, an orthogonal chirp sequence generation circuit 240, a despreading circuit 380, a demodulation circuit 390, and an (optional) error control decoding circuit 395.

The Comms/radar/LIDAR/RELNAV receiver 320 is configured to receive the spread user communication signal (with ranging and detection capability) 140 through antenna/sensor 310. In some embodiments, the received signal $r_j(t)$, for N users (N<P) in an additive white Gaussian noise (AWGN) channel, may be modeled by the following equation:

$$r_j(t) = \sum_{q=1}^{N} g_{q,j}(t) * \left\{\sqrt{p_q}\, d_q(t - \tau_q) S_q(t - \tau_q)\right\} + n(t)$$

where $d_q$ is the transmitted data, $S_q$ is the orthogonal sequence, $p_q$ is the power, and $\tau_q$ is the delay for the $q^{th}$ user and n(t) is a noise process. The signal is received at the $j^{th}$ user.

The training pulse extraction circuit 325 is configured to extract the training pulses 265 from the received communication signal 140, for use in multipath processing as described below. In a multipath environment the channel can be modeled as:

$$g_{q,j}(t) = \left(\sum_q (h_q \delta(t - \tau_q) \exp(j2\pi f_d(q, j)t))\right) * \exp(j2\pi f_{CFO} t)$$

where $h_i$ is the complex impulse response of the $i^{th}$ multipath ray, CFO is the carrier frequency offset, and $f_d(q,j)$ is the Doppler shift of the $q^{th}$ pulse of the $j^{th}$ multipath ray.

The CAF timing estimation circuit 330 is configured to estimate the time of arrival for each multipath ray of the received signal using the training pulses 265. In some embodiments, the CAF function expressed below is applied to the received signal r(t).

$$C(\tau, \omega) = \sum_{k=0}^{M-1} \int_T S_q(t-\tau) r_j^*(t-kT) \exp(j\omega t)$$

where $S_q(t)$ are known training signals, T is the time gap between 2 training signals, and M is the number of training signals to be used for the estimation.

The velocity and CFO estimation circuit 340 is configured to jointly estimate the velocity and CFO of each multipath ray using the training pulses 265. In some embodiments, the joint CFO and velocity estimation of the $q^{th}$ multipath ray can be estimated by solving the following optimization problem:

$$\operatorname*{argmin}_{f_{CFO}, \Delta v} \sum_k |\emptyset(k, k+1) - 2\pi(f_{CFO} + \Delta v(f_{k+1}(k+1) - f_k(k))/c)T|$$

where $\emptyset(k,k+1)$ is the phase difference between the $k^{th}$ and $(k+1)^{th}$ training signals, T is the time gap between 2 training signals, and c is the speed of light. In some embodiments, the solution may be obtained by least-squares and linear regression techniques. The CFO removal circuit 350 is configured to remove or correct the frequency offset from each multipath ray.

The channel estimation circuit 360 is configured to estimate multipath effects on the ranging and detection communication signal, the channel estimation based on predetermined characteristics of training pulses included in the ranging and detection communication signal. In some embodiments, the channel estimation circuit 360 employs a matched filter. In some other embodiments, the channel estimation circuit 360 employs a linear minimum mean squared error (MMSE) receiver.

The MMSE receiver operates on the samples taken from the received signal $r_j(t)$ and is configured to undo the effects of asynchronous transmission and reception of ORCA signals. Specifically, while the individual users' ORCA sequences are designed to be orthogonal (and thus not interference inducing) when they are aligned, in practice receivers will not observe such an alignment. Consequently, each concurrent user sequence will induce interference in the reception of every other user sequence when demodulation is performed with a simple matched filter. The MMSE filter performs a linear de-correlating rotation on the received samples that is known to be optimal in terms of minimizing the energy of the aggregate estimation error.

The samples of the received signal can then be modeled as either:

$$r = SAd + n \text{ or } r = \tilde{S}Ad + n$$

where r is an m-length vector of sampled values of $r_j(t)$ and S is a matrix wherein the individual columns of S are the time aligned ORCA sequences for each user symbol in d, and A is a diagonal matrix specifying the received complex amplitudes of each modulated ORCA sequence. Alternatively, the columns of matrix $\tilde{S}$ are the time aligned end-to-end impulse response (including the Doppler/multipath propagation channel and spreading sequence). The parameters defining these matrices can be estimated using the channel estimation circuit 360 discussed above. To recover the user data vector d, the MMSE filter forms the intermediate estimate:

$$\check{d} = (A^H S^H S A + \sigma^2 I)^{-1} S^H r$$

where $S^H$ is the Hermitian transpose of S. This intermediate estimate is then "sliced" to the known constellation of each symbol in the data sequence d.

The RAKE receiver 370 is configured to reduce multipath fading of the ranging and detection communication signal based on the channel estimation. In some embodiments, the rake receiver 370 uses Maximum Ratio Combining (MRC) techniques to combine the corrected multipath rays.

As previously described, the orthogonal chirp sequence generation circuit 240 is configured to generate a Fourier based orthogonal chirp sequence of length P, wherein P is a prime number selected to be greater than a desired number of users targeted for communication. The orthogonal chirp sequence is based on the identification number 230 of the user of the receiver system 170 that is targeted for communication.

The despreading circuit 380 is configured to perform despreading, by the orthogonal chirp sequence, of the communication signal 140 received by the system (e.g., the spread user signal 255), after RAKE receiver processing to combine the multipath rays, to generate a modulated message directed to the user associated with the system.

The demodulation circuit 390 is configured to demodulate the message using any suitable modulation technique. In some embodiments, the demodulation may be phase shift keying (PSK) demodulation, such as quadrature PSK (QPSK) or other constant modulus phase shift keying (N-PSK). In some embodiments, the demodulation will be configured to match the modulation 220 performed by the ORCA platform transmission system 120.

The error control decoding circuit 395 is configured to perform convolutional decoding and/or Reed-Solomon decoding on the demodulated message to improve communication performance (e.g., bit error rate). In some embodiments, the error decoding will be configured to match the error coding 210 performed by the ORCA platform transmission system 120. In some other embodiments, error control decoding may employ Low Density Parity Check Codes (LDPC) or Turbo Codes (TC).

Figure 4:
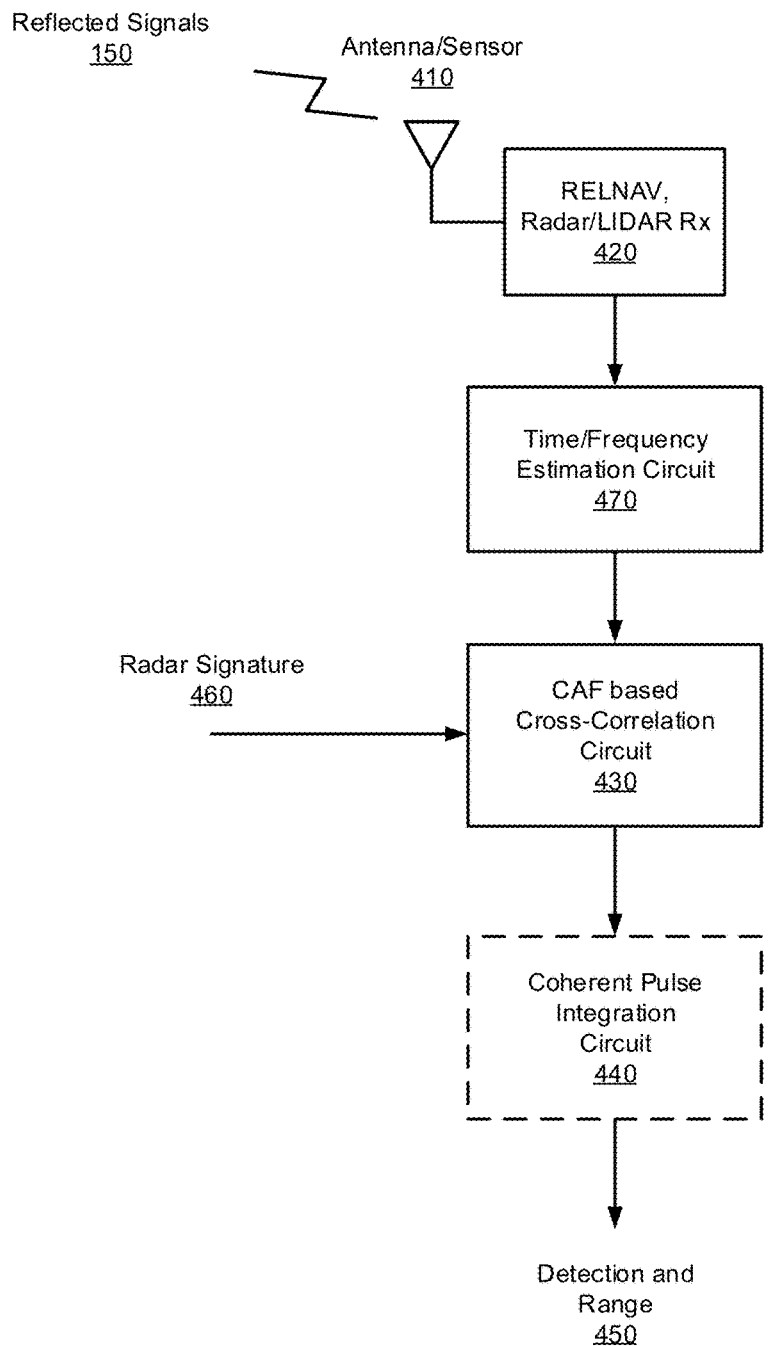
FIG. 4 is a block diagram of an ORCA platform receiver system, configured in accordance with certain embodiments of the present disclosure.

FIG. 4 is a block diagram of an ORCA platform receiver system 130, configured in accordance with certain embodiments of the present disclosure. The ORCA platform receiver system 130 is shown to include an antenna/sensor 410, a radar/LIDAR receiver 420, a cross-correlation circuit 430, and an (optional) coherent pulse integration circuit 440.

The radar/LIDAR receiver 420 is configured to receive a reflection 150 of the spread user communication signal 140 from a platform 160 associated with one of the targeted users, through antenna/sensor 410.

The cross-correlation circuit or the CAF 430 is configured to detect the platform 160 and to calculate a range to the platform based on a timing estimation of a pulse generated by cross-correlation of the spread user communication signal 140, which was transmitted, with the received reflection of the spread user signal 150.

In some embodiments, an optional coherent pulse integration circuit 440 is configured to improve the timing estimation of the pulse based on an integration of pulses generated from additional received reflections of the spread user signal over a period of time, which in turn improves the detection and range estimate 450.

Figure 5:
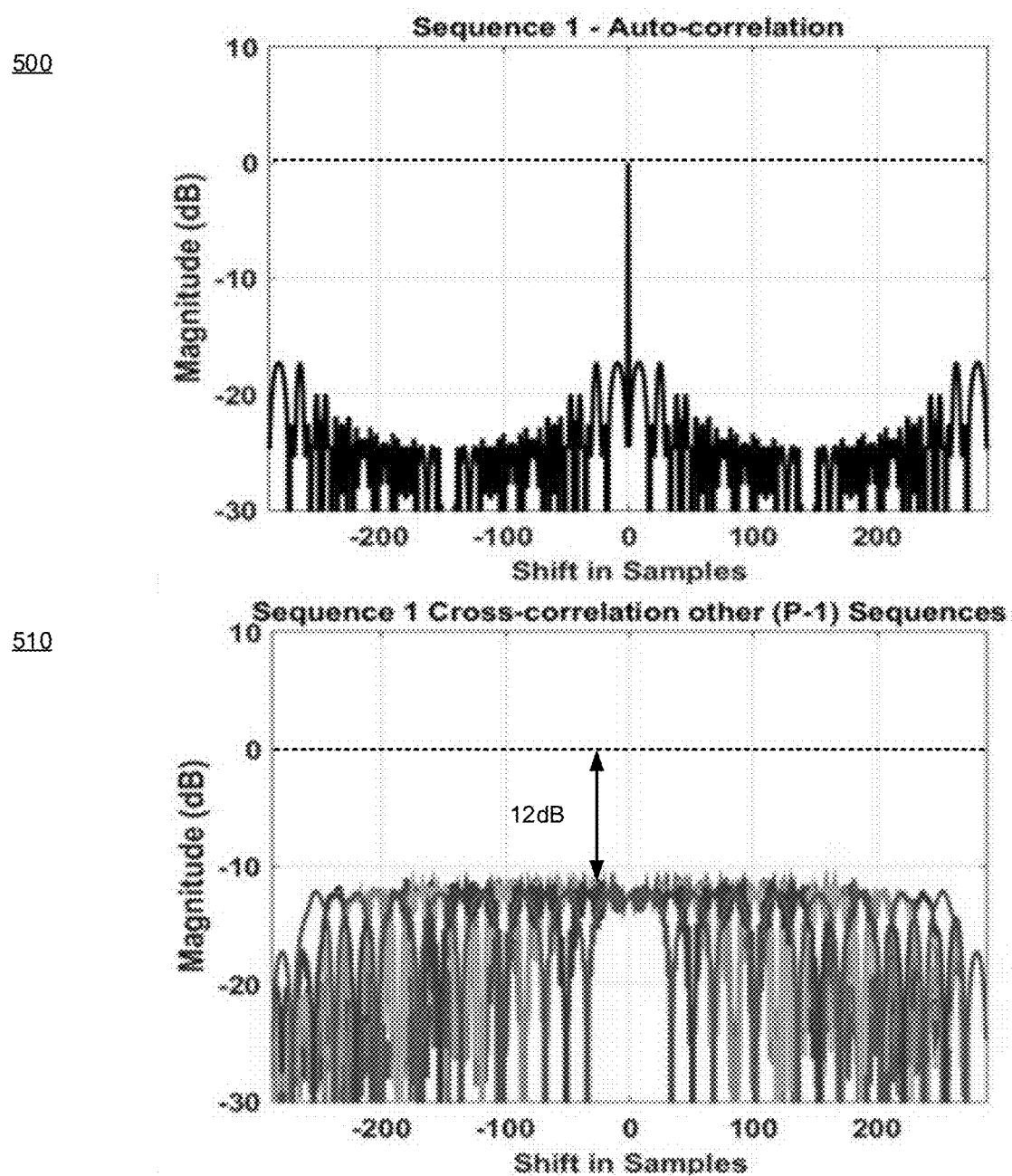
FIG. 5 illustrates auto-correlation and cross-correlation properties of the orthogonal chirp sequences, in accordance with certain embodiments of the present disclosure.

FIG. 5 illustrates auto-correlation and cross-correlation properties of the orthogonal chirp sequences, in accordance with certain embodiments of the present disclosure. A set of orthogonal chirp sequences was generated for the case P=17, and plot 500 illustrates the auto-correlation of the first of the 16 (P−1) sequences. Plot 510 illustrates the cross-correlation between the first sequence and the remaining 15 sequences. The peaks of the cross-correlations are approximately 12 dB lower than the peak of the autocorrelation, indicating that these orthogonal chirp sequences provide 12 dB of isolation from each other when used for multiuser communications (e.g., 16 users) or for ranging and detection purposes. In the case of P=31 (e.g., 30 users) the orthogonal chirp sequences can provide approximately 15 dB of isolation.

Figure 6:
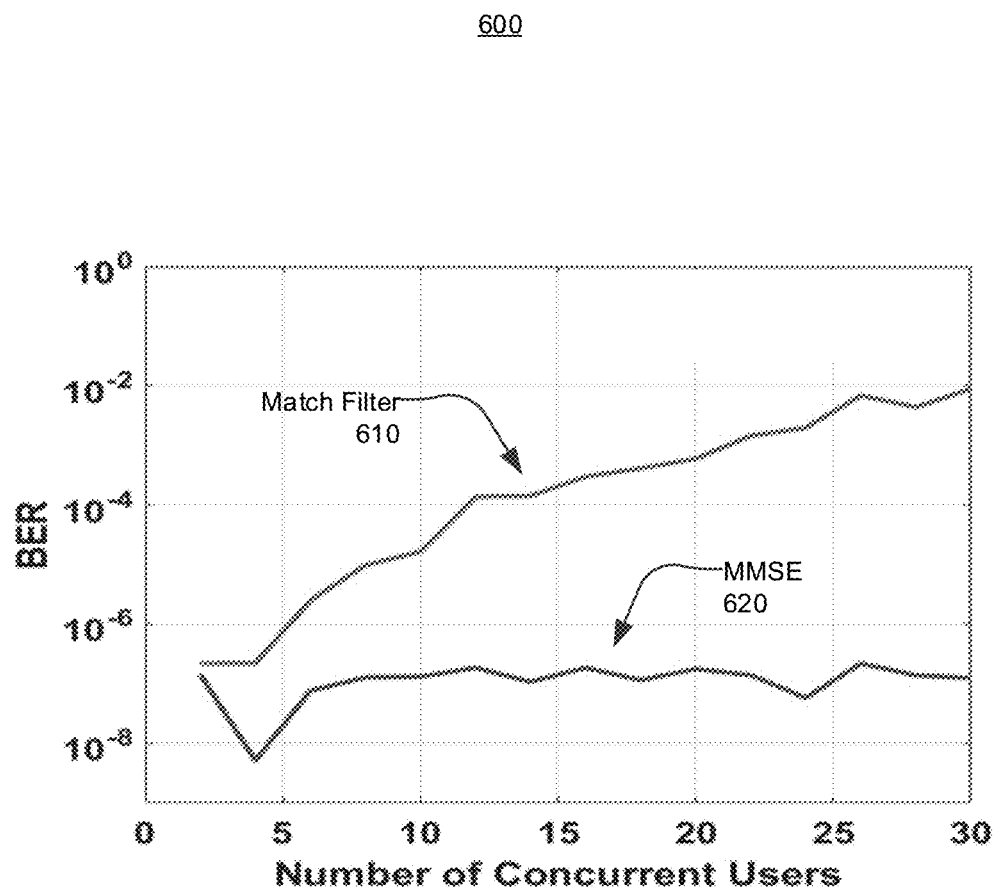
FIG. 6 is a plot of the bit error rate (BER) of the system, in accordance with certain embodiments of the present disclosure.

FIG. 6 illustrates the bit error rate (BER) 600 of the system, in accordance with certain embodiments of the present disclosure. For this example, the SNR for the user of interest is −30 dB while the SNR for the other concurrent users is −10 dB. Plot 610 shows that the BER increases as the number of concurrent users increases for the case where matched filtering is used for multipath channel estimation. Plot 620 shows that the BER remains relatively constant as the number of concurrent users increases for the case where linear minimum mean squared error (MMSE) is used for multipath channel estimation. The MMSE receiver is able to successfully demodulate 30 users at a BER approximating that of the single user case.

Methodology

Figure 7:
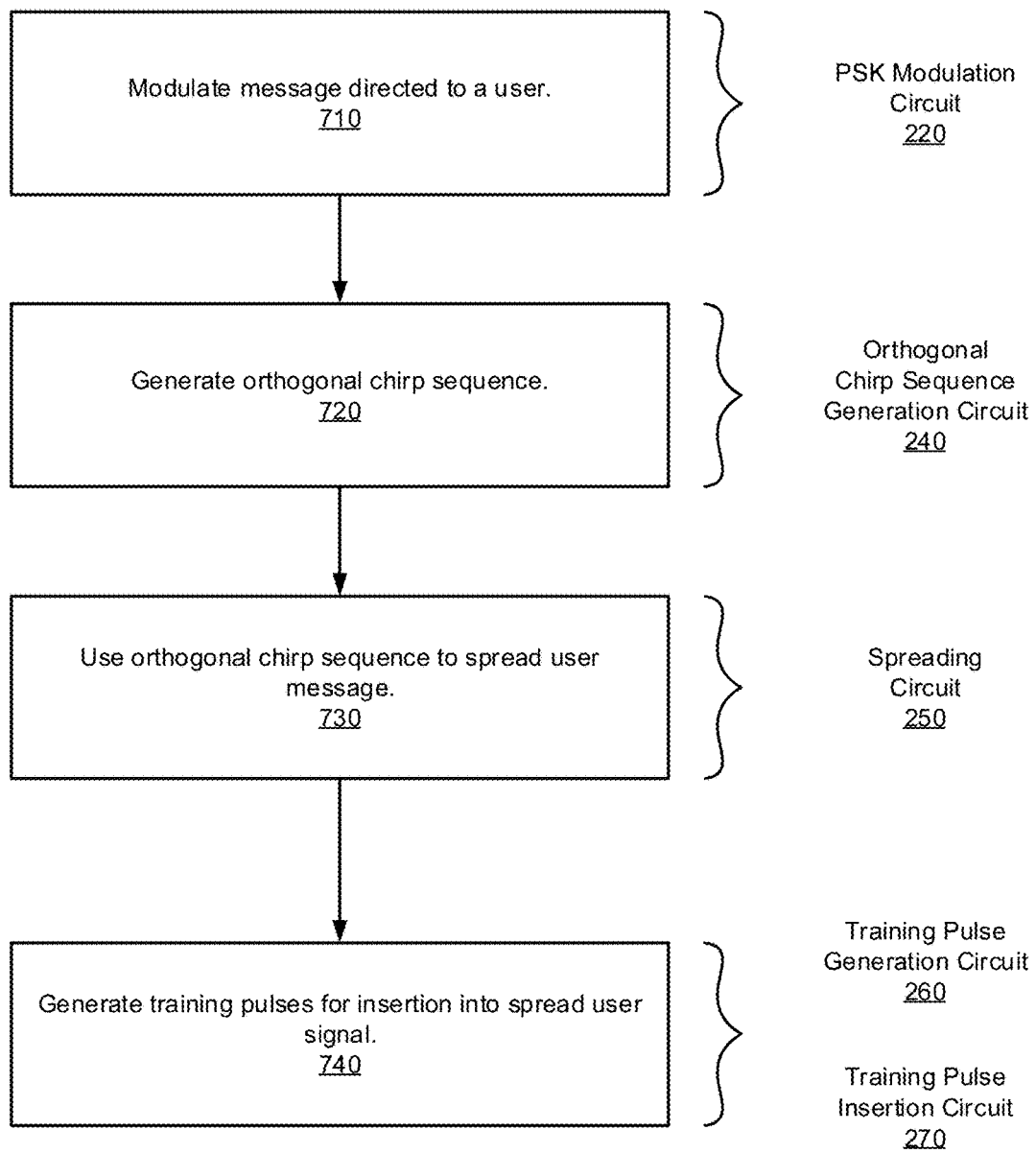
FIG. 7 is a flowchart illustrating a methodology for transmission of a multi-user communications waveform with LIDAR, RADAR and RELNAV capabilities, in accordance with certain other embodiments of the present disclosure.

FIG. 7 is a flowchart illustrating a methodology for transmission of a multi-user communications waveform with detection and ranging capability, in accordance with certain other embodiments of the present disclosure. As can be seen, example method 700 includes a number of phases and sub-processes, the sequence of which may vary from one embodiment to another. However, when considered in the aggregate, these phases and sub-processes form a process for multi-user communications transmission, from an ORCA platform, with detection and ranging capability, in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIG. 7 to the specific components illustrated in FIGS. 1-4 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 7, in one embodiment method 700 commences, at operation 710, by modulating a message directed or targeted to one of a number of users. In some embodiments the modulation may be phase shift keying, such as, for example, quadrature phase shift keying (QPSK) or other constant modulus phase shift keying (N-PSK).

Next, at operation 720, a Fourier based orthogonal chirp sequence of length P is generated, where P is a prime number selected to be greater than the desired number of users that may be targeted for communication. The orthogonal chirp sequence is based on an identification number (in the range of one to P−1) of the user to which the modulated message is directed.

At operation 730, the modulated message is spread by the orthogonal chirp sequence to generate a spread user signal directed to the targeted user. At operation 740, a sequence of training pulses is generated for insertion into the spread user signal to aid in reception of the signal at the user platform.

Of course, in some embodiments, additional operations may be performed, as previously described in connection with the system. These additional operations may include, for example, transmitting the spread user signal and receiving a reflection of the signal from a platform associated with the targeted users. The platform may be detected, and a range to the platform may be calculated, based on timing estimation of a pulse generated by cross-correlation of the spread user signal with the received reflection of the spread user signal.

In some embodiments, convolutional error coding and Reed-Solomon error coding may be performed on the message prior to modulation, to improve bit error rate performance. In some embodiments, the spread user signal may be transmitted as a radar signal or a LIDAR signal.

Figure 8:
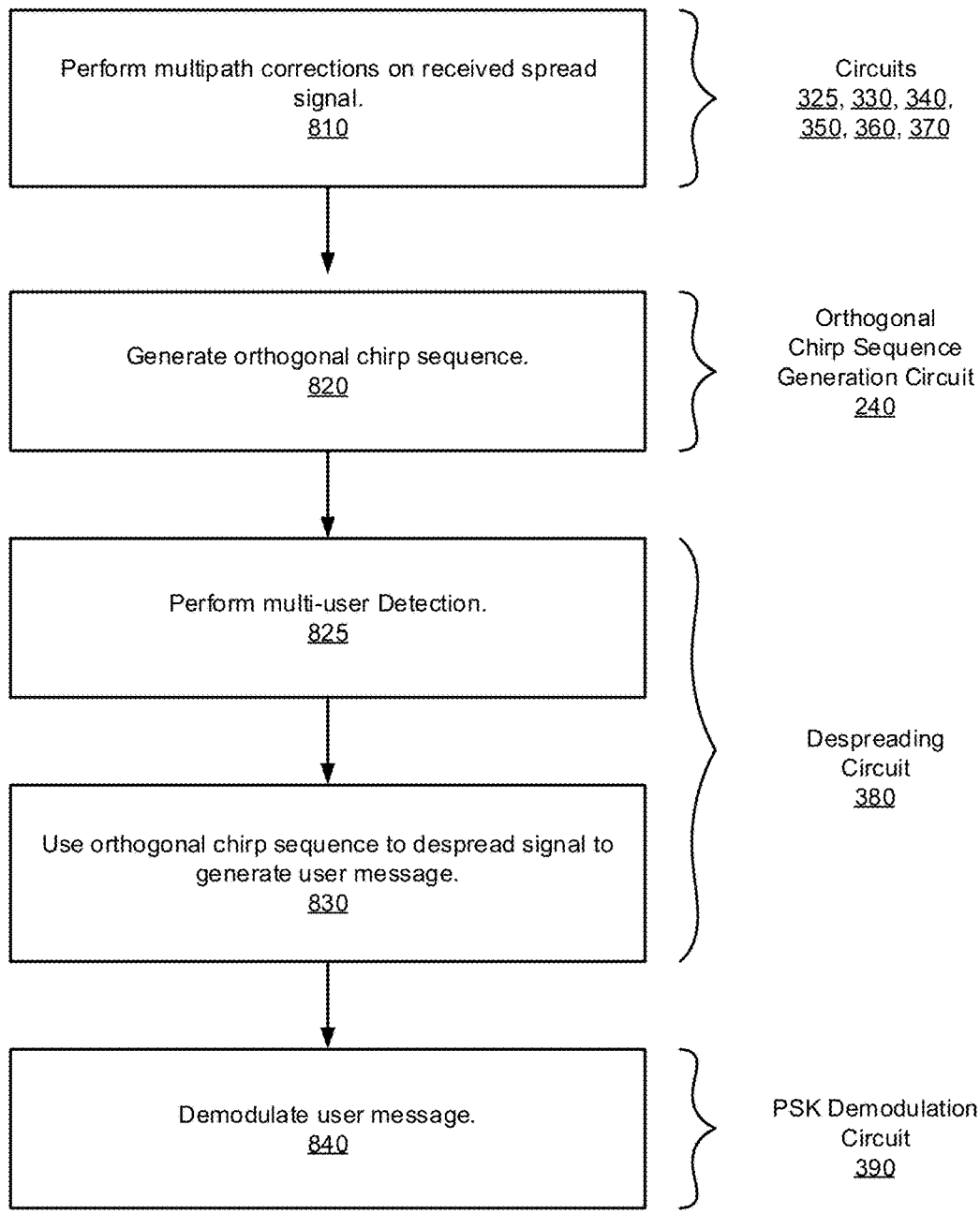
FIG. 8 is a flowchart illustrating a methodology for reception of a multi-user communications waveform with LIDAR, RADAR and RELNAV capabilities, in accordance with certain other embodiments of the present disclosure.

FIG. 8 is a flowchart illustrating a methodology for reception of a multi-user communications waveform with detection and ranging capability, in accordance with certain other embodiments of the present disclosure. As can be seen, example method 800 includes a number of phases and sub-processes, the sequence of which may vary from one embodiment to another. However, when considered in the aggregate, these phases and sub-processes form a process for multi-user communications reception at a user platform, in accordance with certain of the embodiments disclosed herein. These embodiments can be implemented, for example using the system architecture illustrated in FIGS. 1-4, as described above. However other system architectures can be used in other embodiments, as will be apparent in light of this disclosure. To this end, the correlation of the various functions shown in FIG. 8 to the specific components illustrated in FIGS. 1-4 is not intended to imply any structural and/or use limitations. Rather other embodiments may include, for example, varying degrees of integration wherein multiple functionalities are effectively performed by one system. Numerous variations and alternative configurations will be apparent in light of this disclosure.

As illustrated in FIG. 8, in one embodiment method 800 commences, at operation 810, by, performing multipath corrections on a ranging and detection communication signal received by the system. In some embodiments, a channel estimation circuit estimates multipath effects on the signal based on predetermined characteristics of training pulses included in the signal, and a RAKE receiver performs the reduction of the estimated multipath effects.

Next, at operation 820, a Fourier based orthogonal chirp sequence of length P is generated, where P is a prime number selected to be greater than the desired number of users that may be targeted for communication. The orthogonal chirp sequence is based on an identification number (in the range of one to P−1) of the user associated with the user platform hosting the receiver system.

At operation 830, the multipath corrected received ranging and detection communication signal is despread by the orthogonal chirp sequence to generate a modulated message directed to the user. At operation 840, the modulated message is demodulated, for example by phase shift keying demodulation.

Of course, in some embodiments, additional operations may be performed, as previously described in connection with the system. These additional operations may include, for example, performing convolutional error decoding and Reed-Solomon error decoding on the demodulated message to improve bit error rate performance. In some embodiments, the received ranging and detection communication signal may be a radar signal or a LIDAR signal.

Example Platform

Figure 9:
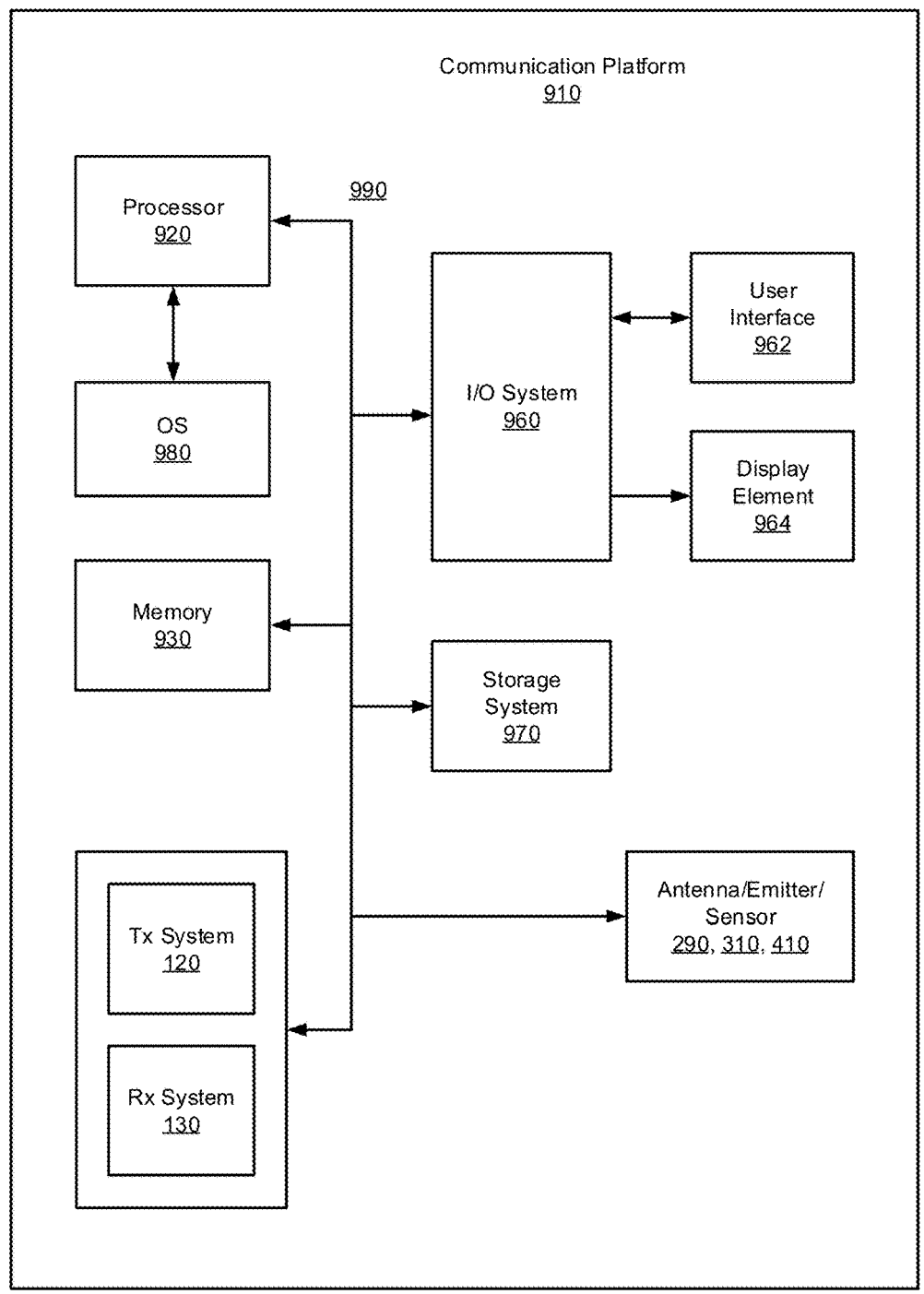
FIG. 9 is a block diagram schematically illustrating a communication platform employing the disclosed multi-user communications system with LIDAR, RADAR and RELNAV capabilities, in accordance with certain embodiments of the present disclosure.

FIG. 9 is a block diagram 900 schematically illustrating a communication platform 910 employing the disclosed multi-user communications system with LIDAR, RADAR, and RELNAV capabilities, in accordance with certain embodiments of the present disclosure. The communication platform 910 may be configured as the ORCA platform 110, the target platform 180, or both. In some embodiments, communications platform 910 may be hosted on, or otherwise be incorporated into, a vehicle such as a self-driving/autonomous car, an aircraft, a watercraft, an Internet of Things (IoT) device, a portable computer system, a radio, and so forth. Any combination of different devices may be used in certain embodiments.

In some embodiments, platform 910 may comprise any combination of a processor 920, a memory 930, transmit and receive systems 120, 130, 170, antennas/emitters/sensors 290, 310, 410, an input/output (I/O) system 960, a user interface 962, a display element 964, and a storage system 970. As can be further seen, a bus and/or interconnect 990 is also provided to allow for communication between the various components listed above and/or other components not shown. Other componentry and functionality not reflected in the block diagram of FIG. 9 will be apparent in light of this disclosure, and it will be appreciated that other embodiments are not limited to any particular hardware configuration.

Processor 920 can be any suitable processor, and may include one or more coprocessors or controllers, such as an audio processor, a graphics processing unit, or hardware accelerator, to assist in control and processing operations associated with platform 910. In some embodiments, the processor 920 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 920 may be implemented as a complex instruction set computer (CISC) or a reduced instruction set computer (RISC) processor.

Memory 930 can be implemented using any suitable type of digital storage including, for example, flash memory and/or random access memory (RAM). In some embodiments, the memory 930 may include various layers of memory hierarchy and/or memory caches as are known to those of skill in the art. Memory 930 may be implemented as a volatile memory device such as, but not limited to, a RAM, dynamic RAM (DRAM), or static RAM (SRAM) device. Storage system 970 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 970 may comprise technology to increase the storage performance enhanced protection for valuable digital media when multiple hard drives are included.

Processor 920 may be configured to execute an Operating System (OS) 980 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 910, and therefore may also be implemented using any suitable existing or subsequently-developed platform.

I/O system 960 may be configured to interface between various I/O devices and other components of platform 910. I/O devices may include, but not be limited to, user interface 962 and display element 964. User interface 962 may include other devices (not shown) such as a touchpad, keyboard, mouse, microphone and speaker, trackball or scratch pad, and camera. I/O system 960 may include a graphics subsystem configured to perform processing of images for rendering on the display element 964. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 920 or any chipset of platform 910.

It will be appreciated that in some embodiments, the various components of platform 910 may be combined or integrated in a system-on-a-chip (SoC) architecture. In some embodiments, the components may be hardware components, firmware components, software components or any suitable combination of hardware, firmware or software.

Transmit system 120 is configured to generate a multi-user communication signal with detection and ranging capability, as described previously. Transmit system 120 may include any or all of the circuits/components illustrated in FIG. 2, as described above. Receiver system 130 is configured to receive a reflection of the multi-user communication signal from a user platform and perform detection and ranging on that user platform, as described previously. Receiver system 130 may include any or all of the circuits/components illustrated in FIG. 4, as described above. Receiver system 170 is configured to receive the multi-user communication signal from the ORCA platform and despread and decode the message contained therein, as described previously. Receiver system 170 may include any or all of the circuits/components illustrated in FIG. 3, as described above. These components can be implemented or otherwise used in conjunction with a variety of suitable software and/or hardware that is coupled to or that otherwise forms a part of platform 910. These components can additionally or alternatively be implemented or otherwise used in conjunction with user I/O devices that are capable of providing information to, and receiving information and commands from, a user.

Various embodiments of platform 910 may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments platform 910 may comprise additional, fewer, or alternative subcomponents as compared to those included in the example embodiment of FIG. 9.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). In some embodiments, the hardware may be modeled or developed using hardware description languages such as, for example Verilog or VHDL. Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Additional Example Waveforms and Results

Figure 10:
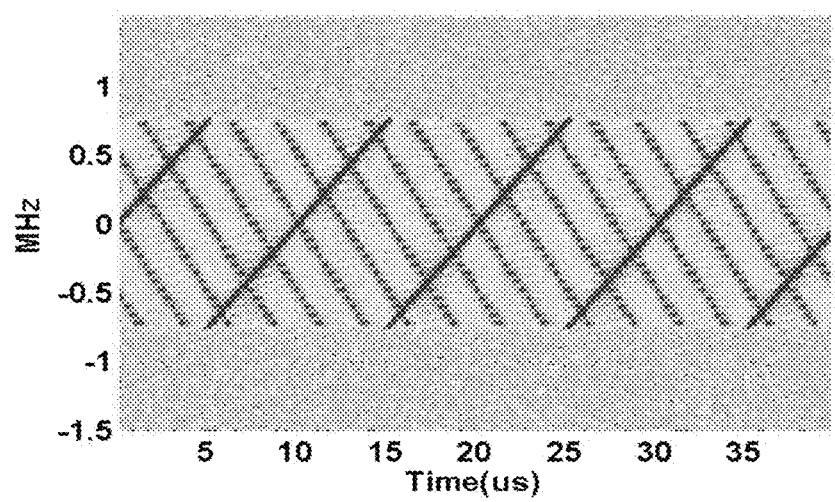
FIG. 10 is an illustration of orthogonal chirp sequences, as may be seen over a certain span of time and frequency, in accordance with certain embodiments of the present disclosure.

FIG. 10 is an illustration of orthogonal chirp sequences 1000 as may be seen over a certain span of time (e.g., 40 usec) and frequency (e.g., 1.5 MHz), in accordance with certain embodiments of the present disclosure.

Figure 11:
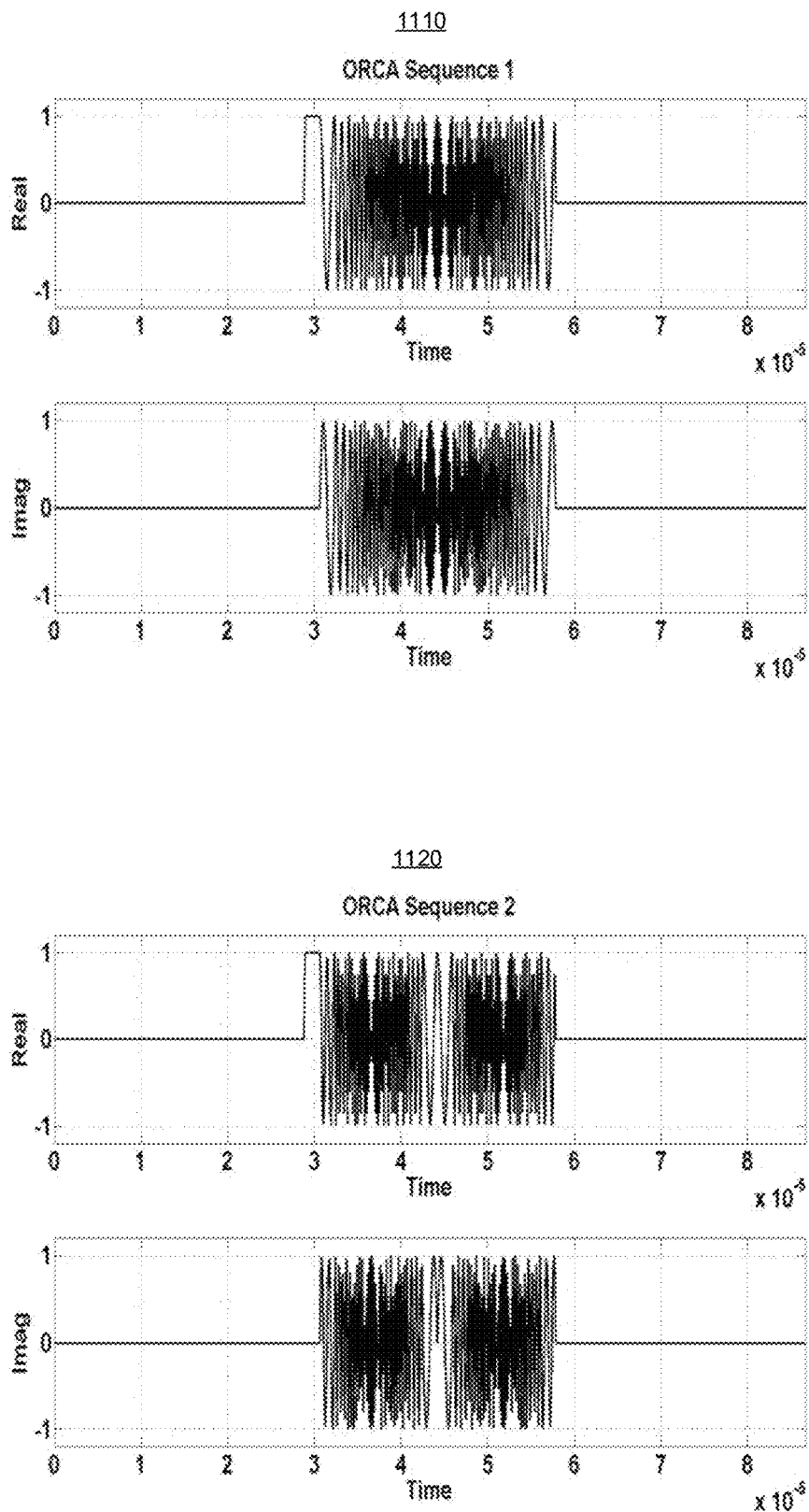
FIG. 11 is an illustration of real and imaginary waveforms of two orthogonal chirp sequences, in accordance with certain embodiments of the present disclosure.

FIG. 11 is an illustration of the real and imaginary waveforms of two orthogonal chirp sequences 1110 and 1120, in accordance with certain embodiments of the present disclosure.

Figure 12:
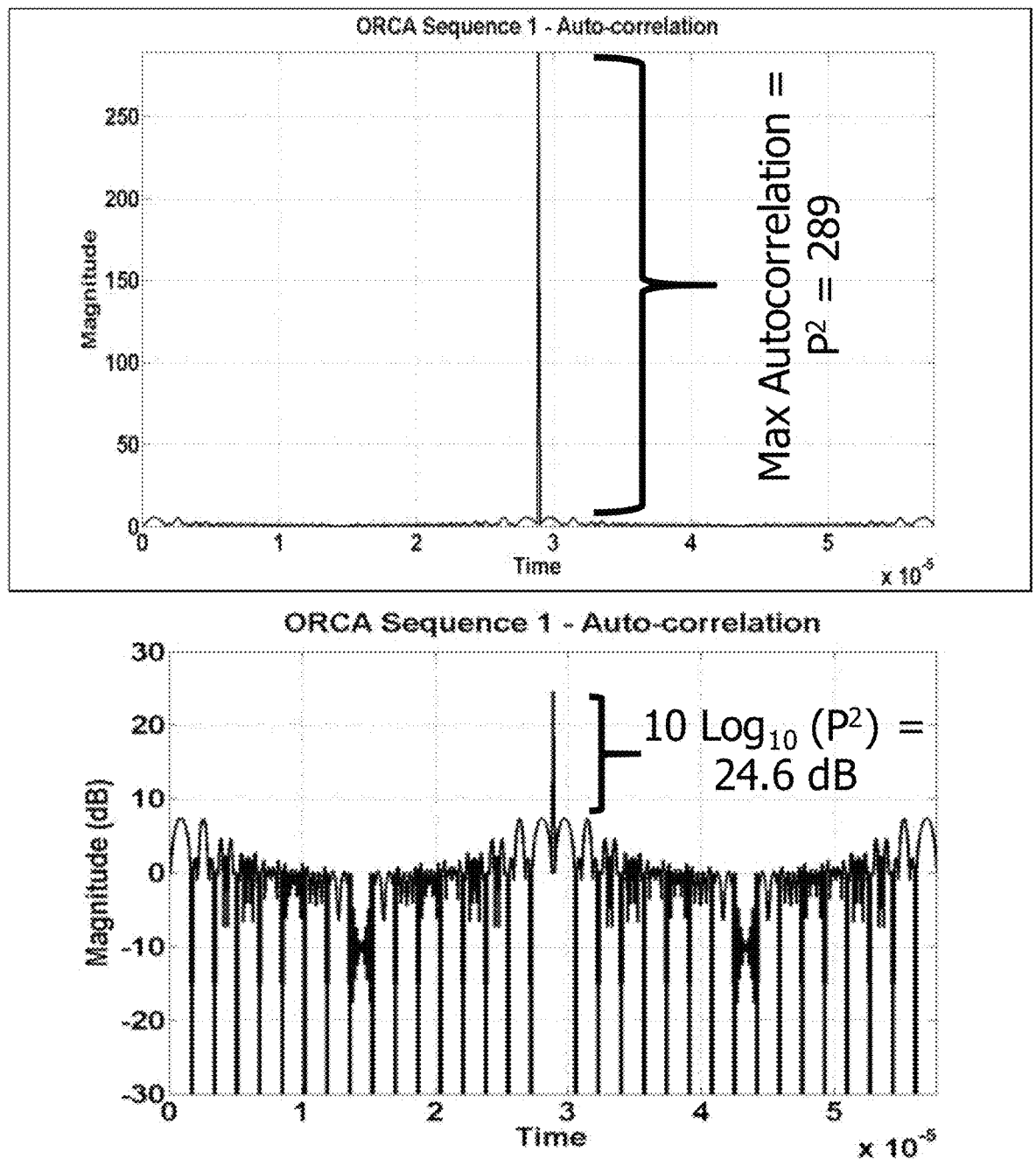
FIG. 12 illustrates auto-correlation properties of the orthogonal chirp sequences, in accordance with certain embodiments of the present disclosure.

FIG. 12 illustrates auto-correlation properties 1200 of the orthogonal chirp sequences, in accordance with certain embodiments of the present disclosure. Specifically, the figure shows the autocorrelation for the parameter P=17.

Figure 13:
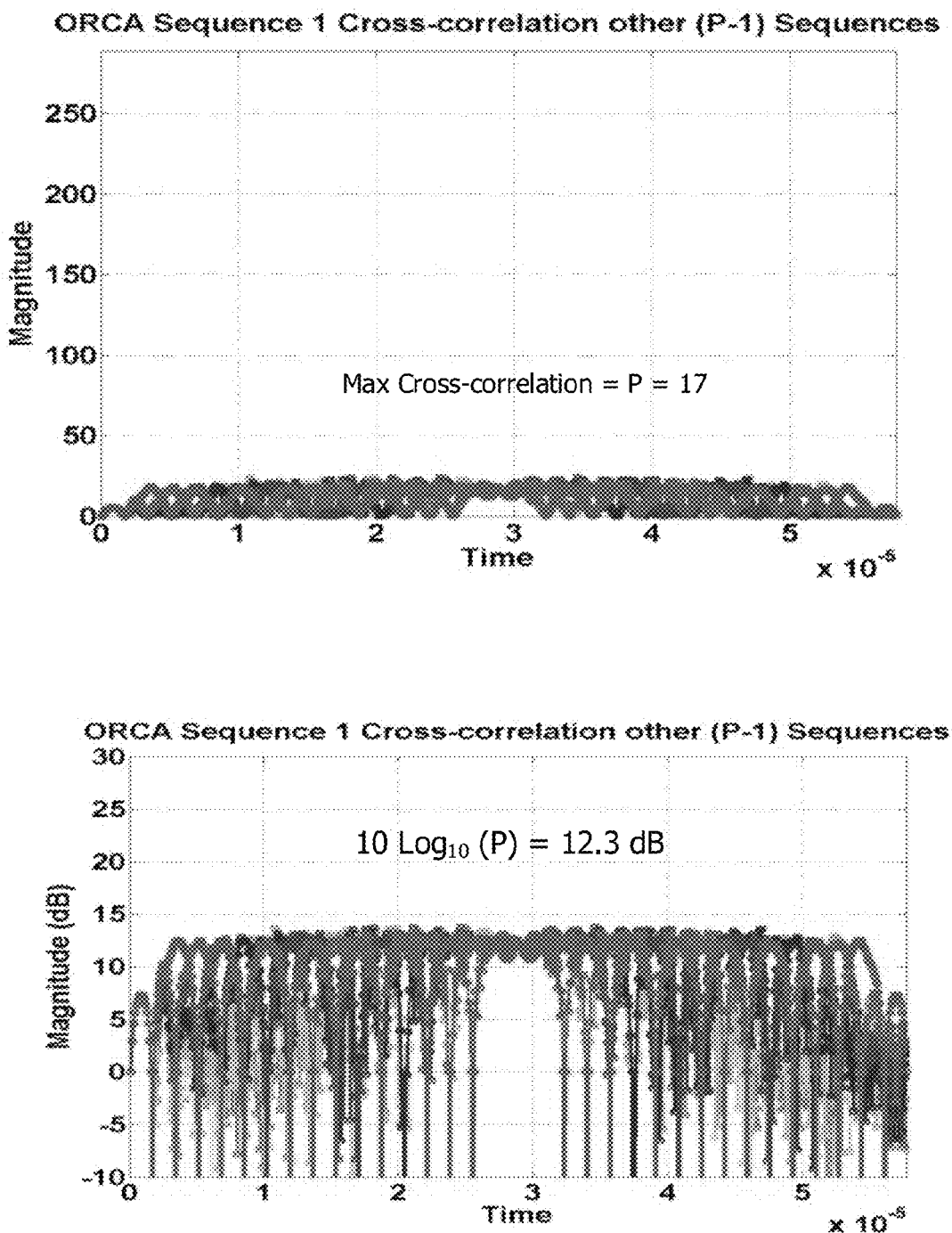
FIG. 13 illustrates cross-correlation properties of the orthogonal chirp sequences, in accordance with certain embodiments of the present disclosure.

FIG. 13 illustrates cross-correlation properties 1300 of the orthogonal chirp sequences, in accordance with certain embodiments of the present disclosure. Specifically, the figure shows the cross-correlation for the parameter P=17.

Figure 14:
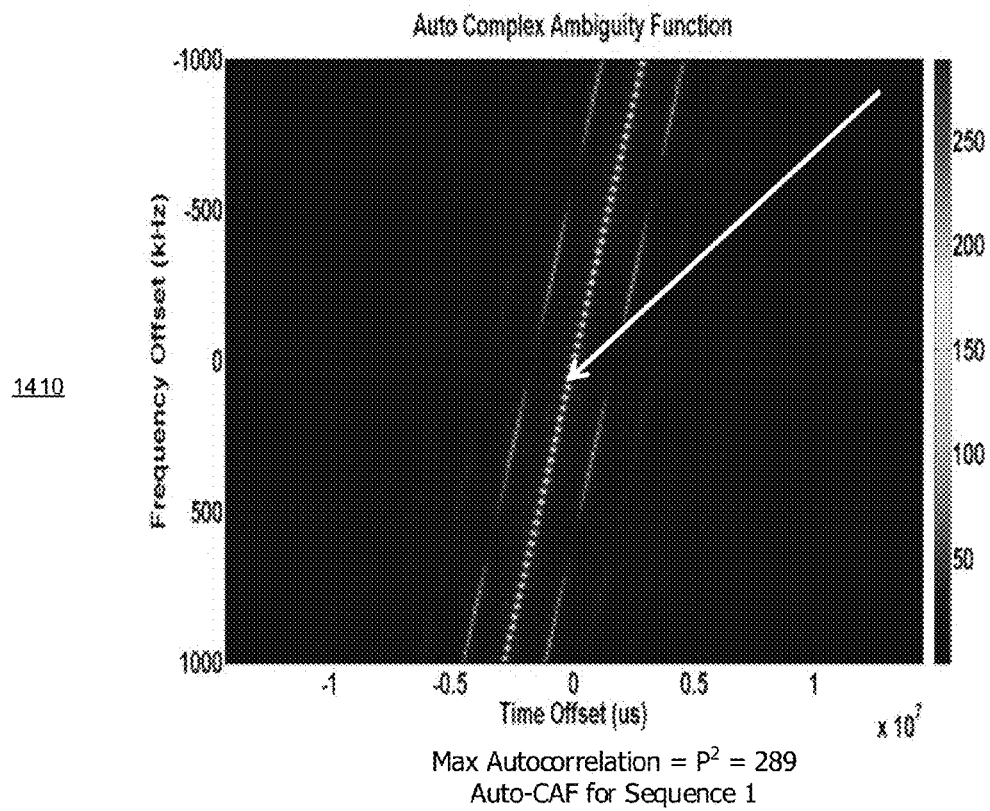
FIG. 14 illustrates the auto and cross Complex Ambiguity Functions (CAF) of the orthogonal chirp sequences in accordance with certain embodiments of the present disclosure.
Figure 14:
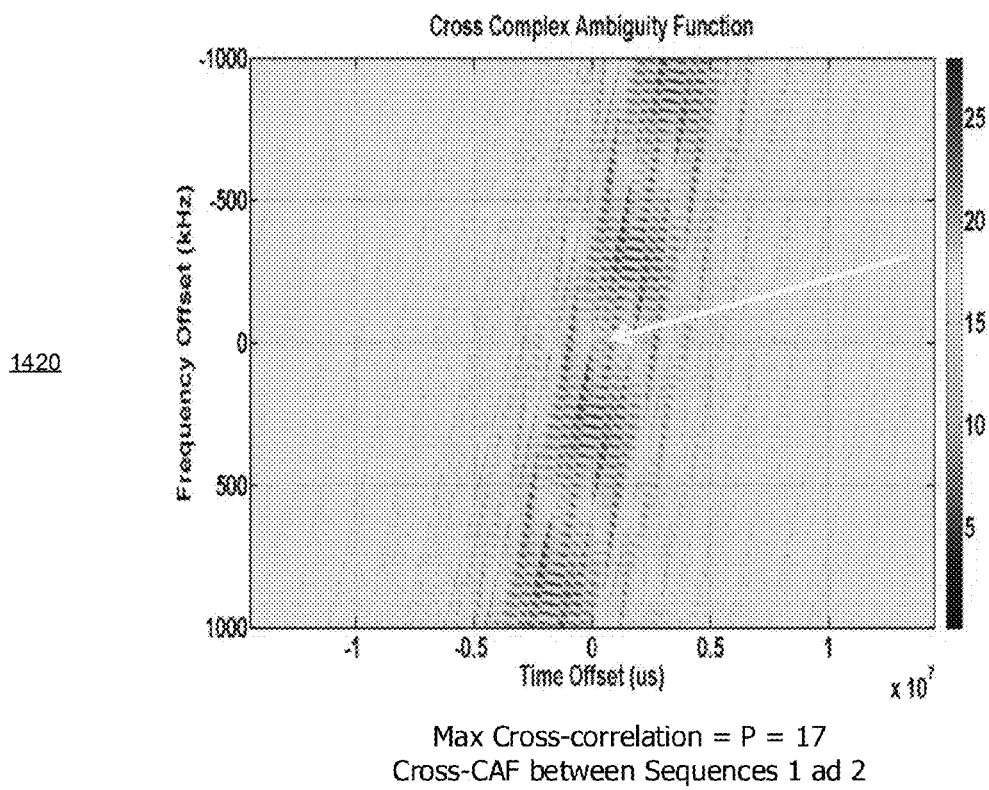

FIG. 14 illustrates the auto 1410 and cross 1420 Complex Ambiguity Functions (CAF) of the orthogonal chirp sequences in accordance with certain embodiments of the present disclosure. CAF is used in many applications, including COMMS, RADAR, LIDAR and RELNAV.

Figure 15:
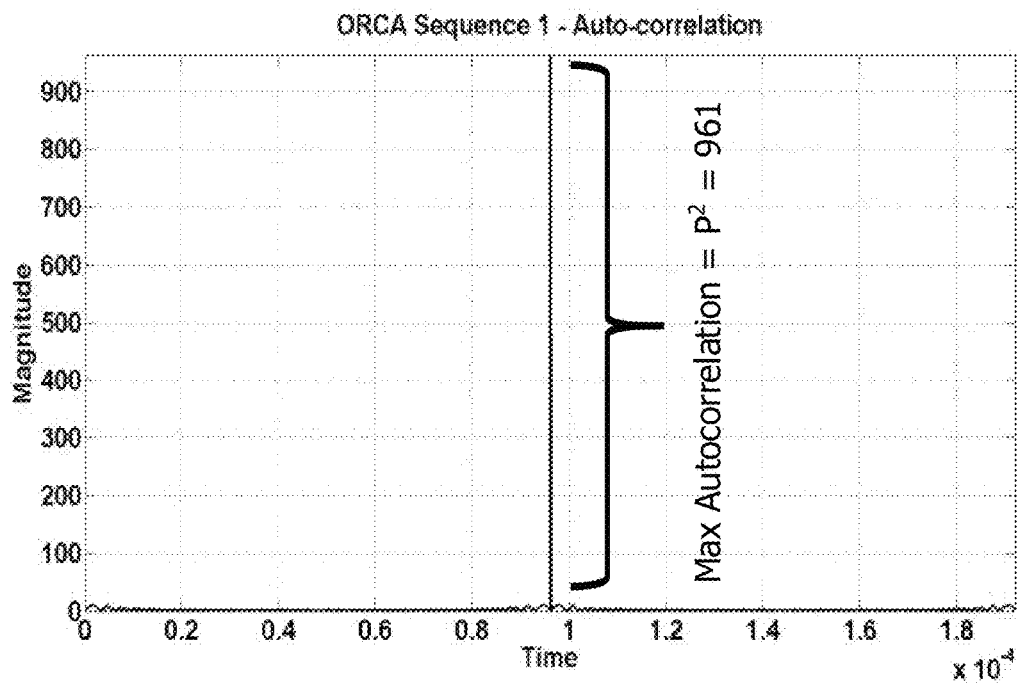
FIG. 15 illustrates auto-correlation properties of the orthogonal chirp sequences, in accordance with certain embodiments of the present disclosure.
Figure 15:
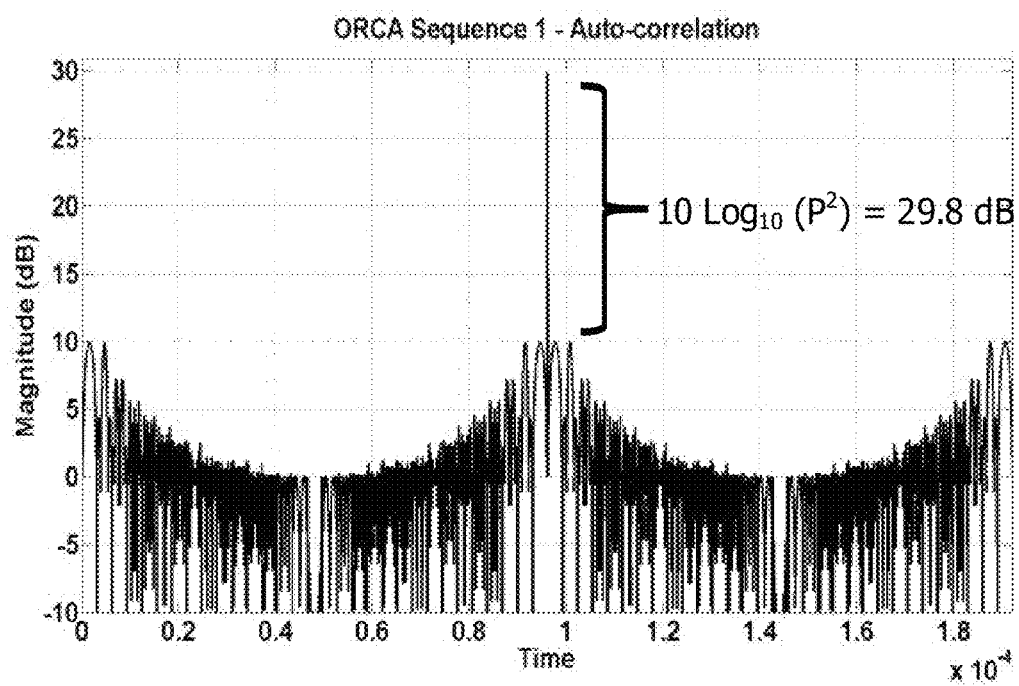

FIG. 15 illustrates auto-correlation properties 1500 of the orthogonal chirp sequences, in accordance with certain embodiments of the present disclosure. Specifically, the Figure shows the autocorrelation for the parameter P=31.

Figure 16:
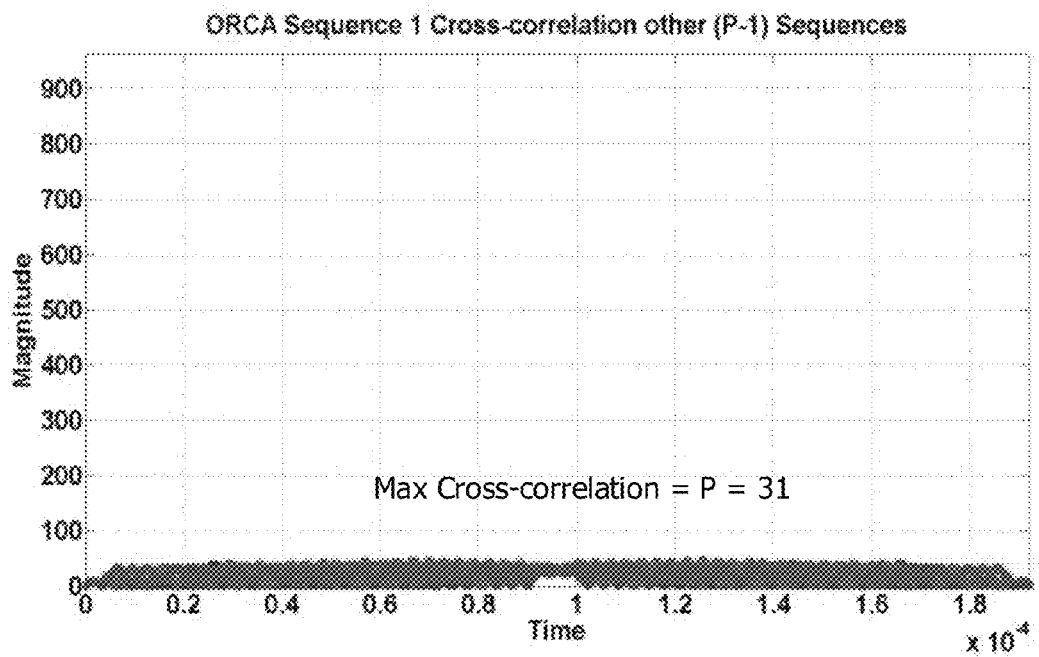
FIG. 16 illustrates cross-correlation properties of the orthogonal chirp sequences, in accordance with certain embodiments of the present disclosure.
Figure 16:
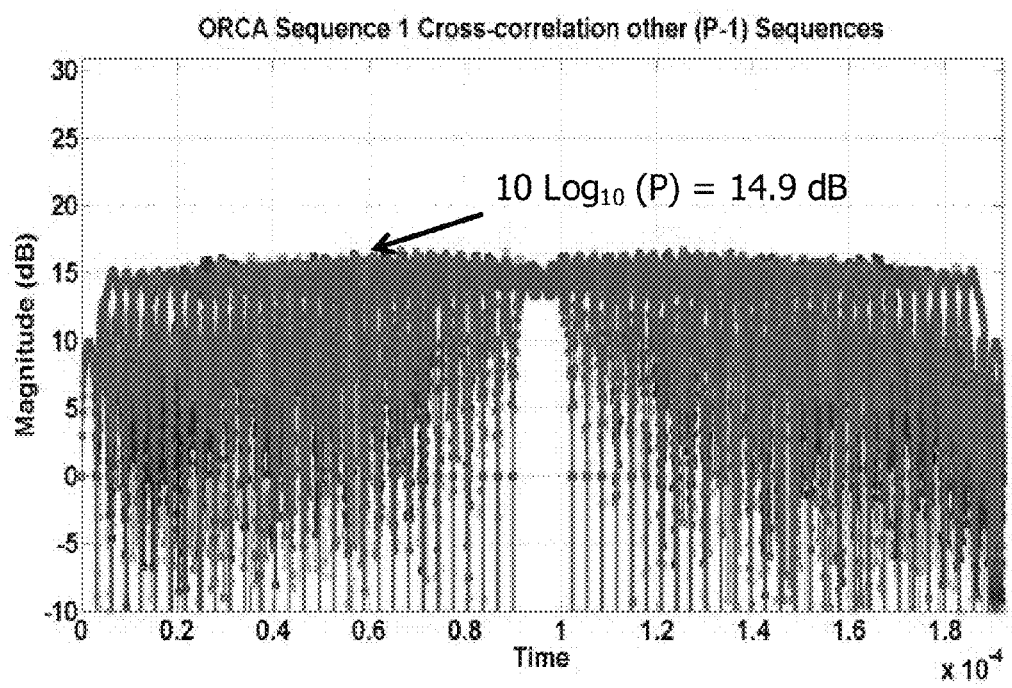

FIG. 16 illustrates cross-correlation properties 1600 of the orthogonal chirp sequences, in accordance with certain embodiments of the present disclosure. Specifically, the Figure shows the autocorrelation for the parameter P=31.

Figure 17:
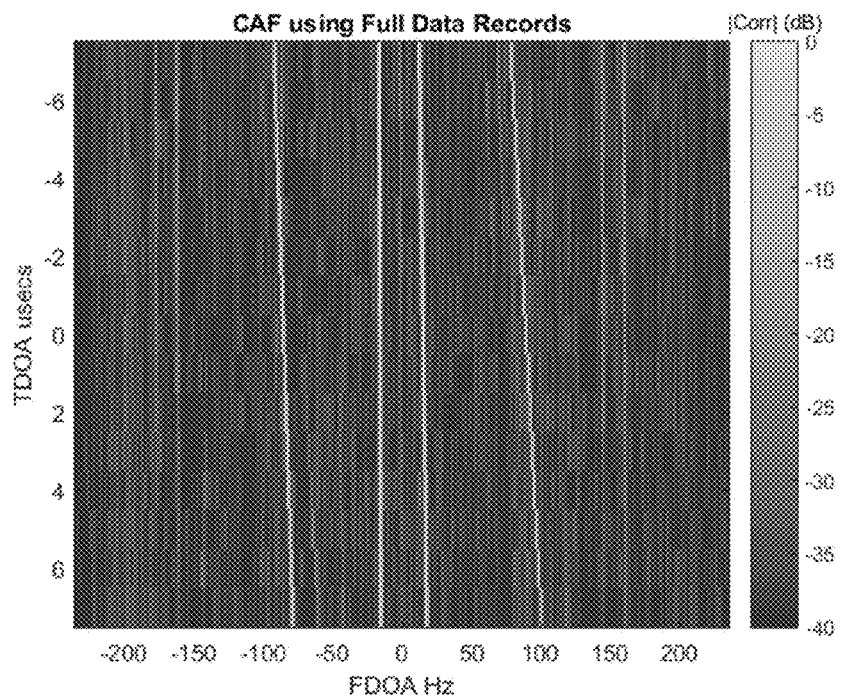
FIG. 17 illustrates CAF estimation of time difference of arrival (TDoA) and frequency difference of arrival (FDoA) for multiple users using orthogonal chirp sequences, in accordance with certain embodiments of the present disclosure.
Figure 17:
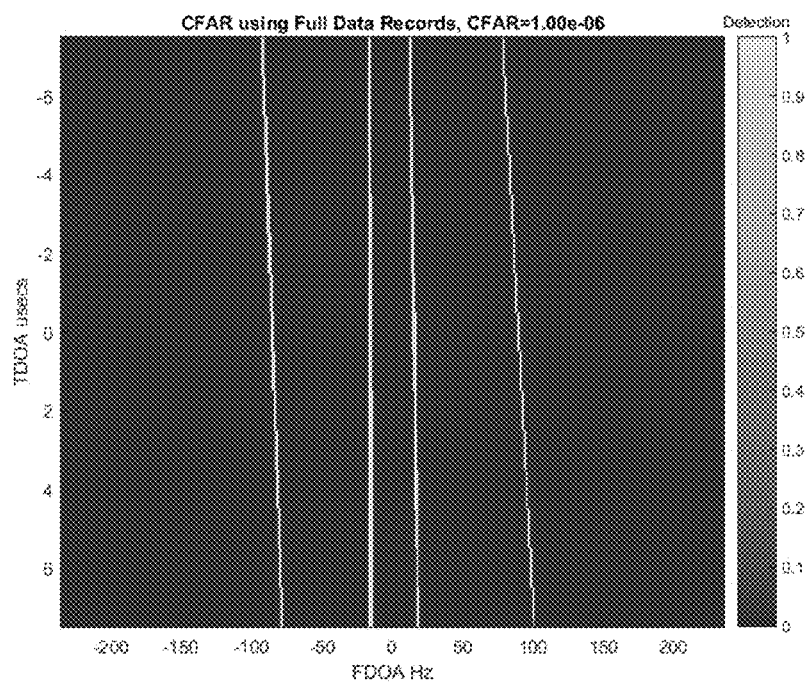

FIG. 17 illustrates CAF estimation of time difference of arrival (TDoA) 1710 and frequency difference of arrival (FDoA) 1720 for multiple users using orthogonal chirp sequences, in accordance with certain embodiments of the present disclosure.

Figure 18:
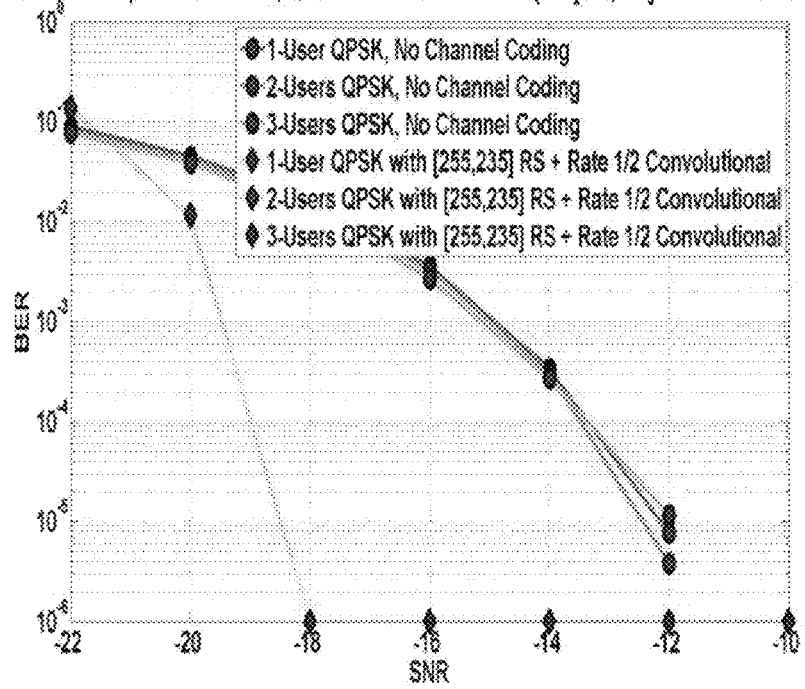
FIG. 18 illustrates BER vs signal to noise ratio (SNR) for multi-user orthogonal chirp COMMS system, in accordance with certain embodiments of the present disclosure.
Figure 18:
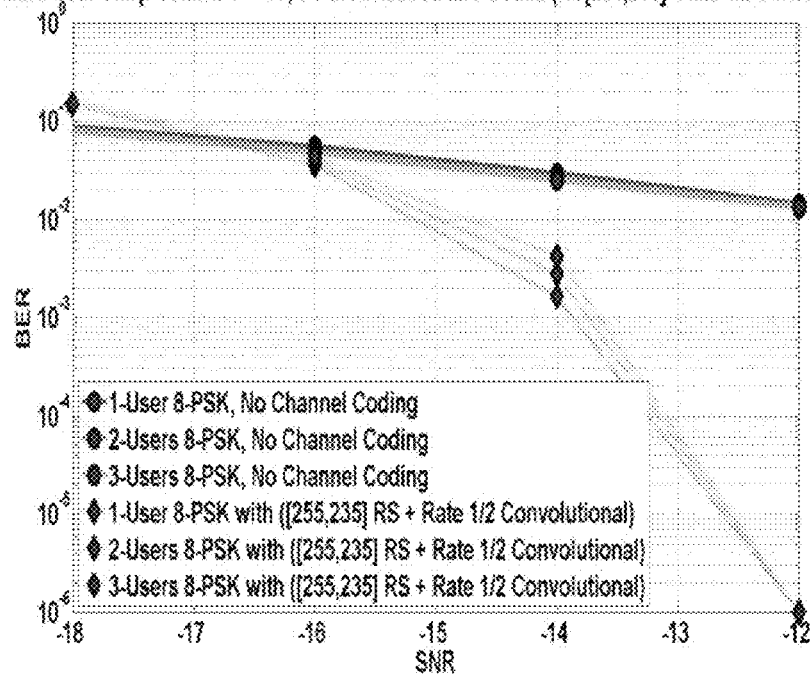

FIG. 18 illustrates the BER vs signal to noise ratio (SNR) for multi-user orthogonal chirp COMMS system for parameter P=17, with quadrature phase shift keying (QPSK) 1810, and 8-Phase Shift Keying (8-PSK) 1820. Both examples employ a concatenated channel coding scheme comprising a Reed Solomon (255, 235) outer code and a Rate ½ Convolutional Code.

Figure 19:
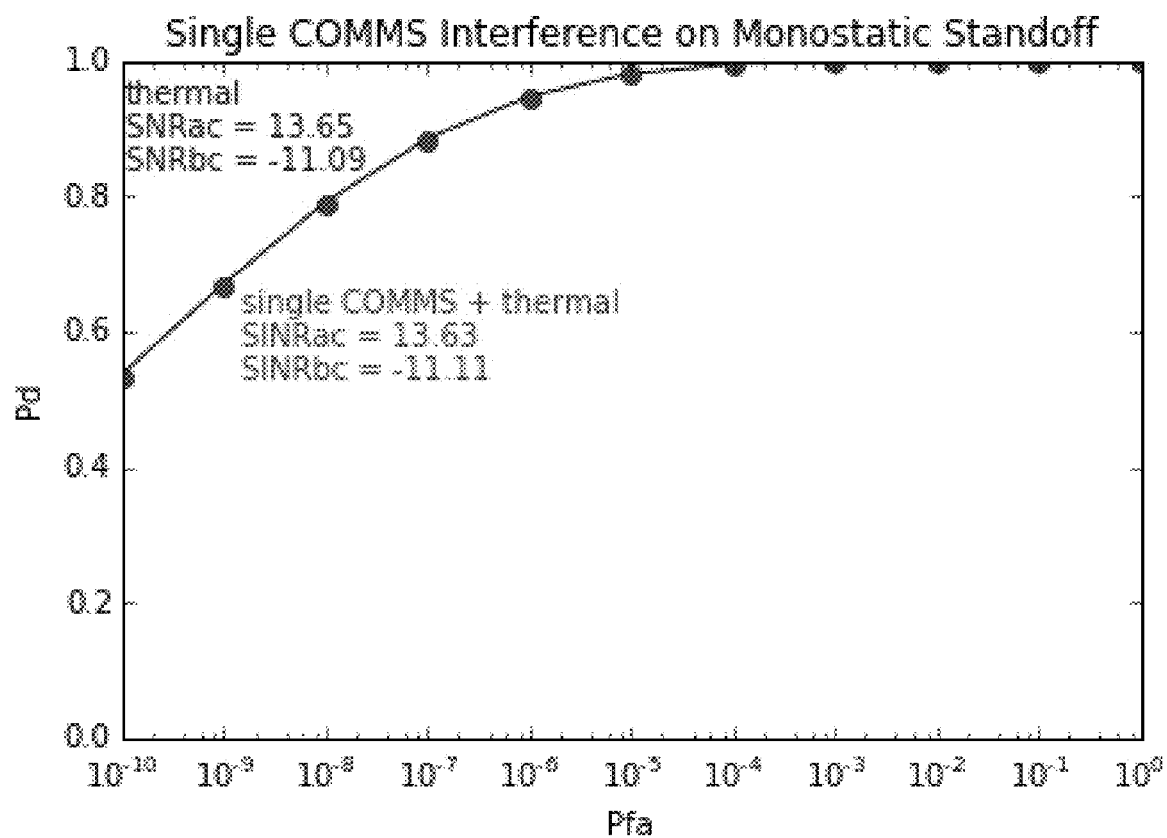
FIG. 19 illustrates the receiver operative characteristics (ROC) performance of the multi-user orthogonal chirp system in simultaneous use for RADAR and COMMS, in accordance with certain embodiments of the present disclosure.

FIG. 19 illustrates the receiver operative characteristics (ROC) performance 1900 of the multi-user orthogonal chirp system in simultaneous use for RADAR and COMMS, in accordance with certain embodiments of the present disclosure. The Figure illustrates the performance when the there is a single COMMS signal that co-exists with the RADAR. The single well-behaved Orthogonal COMMS Signal has little negative impact on RADAR detection performance.

Figure 20:
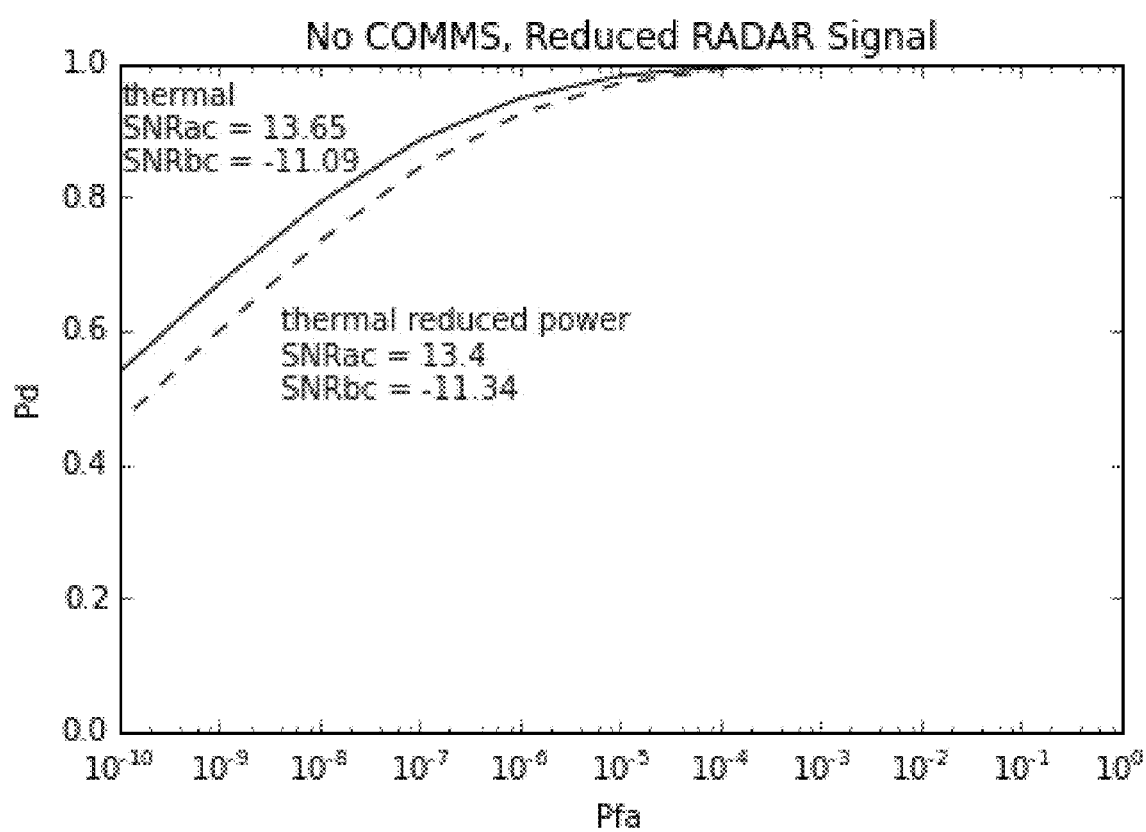
FIG. 20 illustrates the receiver operative characteristics (ROC) performance of the multi-user orthogonal chirp system in use for RADAR with no COMMS present, in accordance with certain embodiments of the present disclosure.

FIG. 20 illustrates the receiver operative characteristics (ROC) performance 2000 of the multi-user orthogonal chirp system when used for RADAR with no COMMS present. The absence of COMMS but lower RADAR signal degrades detection modestly. COMMS signal equal to RADAR signal has little negative impact on RADAR detection performance.

Figure 21:
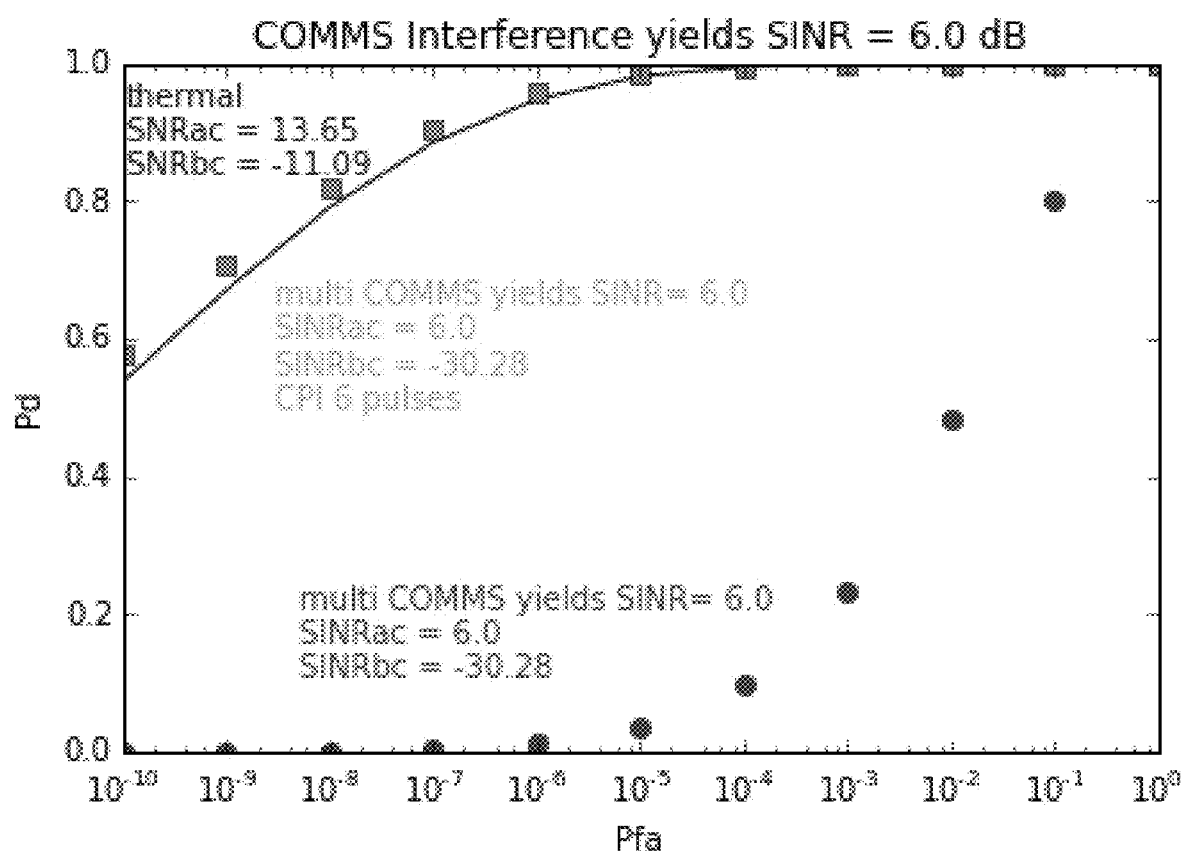
FIG. 21 illustrates another receiver operative characteristics (ROC) performance of the multi-user orthogonal chirp system in simultaneous use for RADAR and COMMS, in accordance with certain embodiments of the present disclosure.

FIG. 21 illustrates another receiver operative characteristics (ROC) performance 2100 of the multi-user orthogonal chirp system when used for RADAR and COMMS simultaneously. The Figure illustrates the performance when the there are multiple COMMS signals that co-exist with the RADAR such that the aggregate power from the COMMS signals is equal to the power of the RADAR at the receiver. Strong COMMS interference degrades detection but coherent pulse integration recovers it. Coherent pulse integration (CPI) of 6 is chosen in this example.

Figure 22:
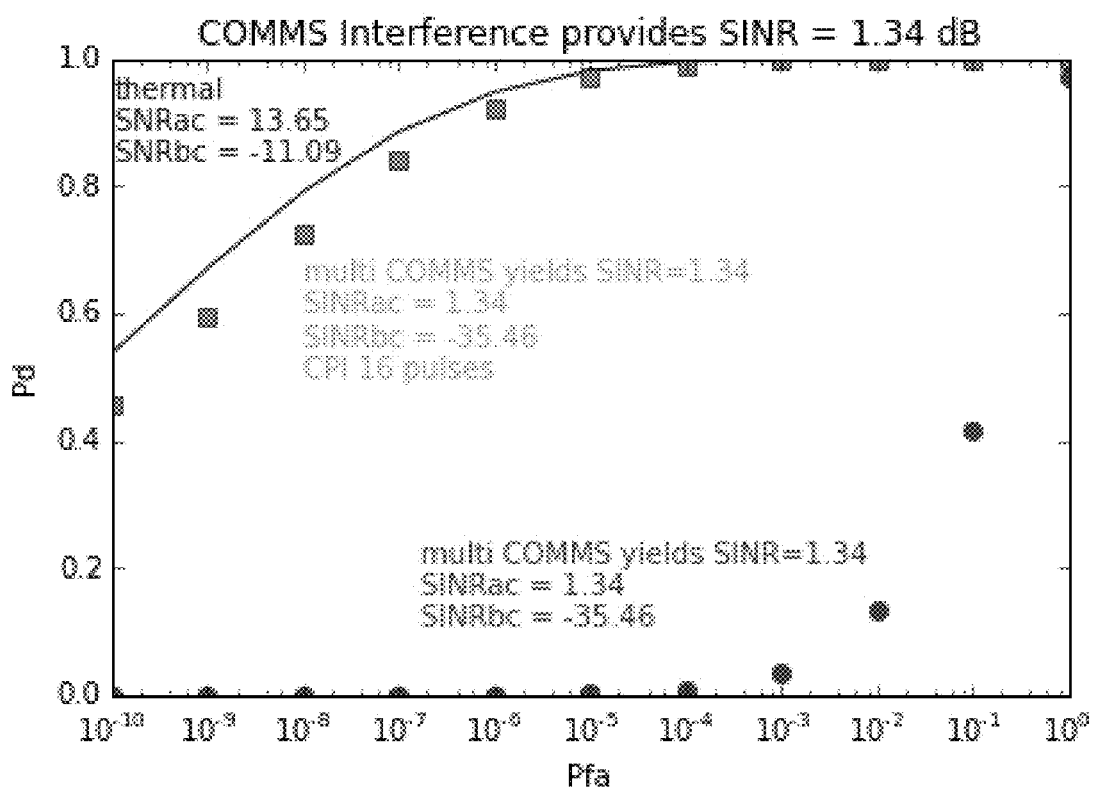
FIG. 22 illustrates another receiver operative characteristics (ROC) performance of the multi-user orthogonal chirp system in simultaneous use for RADAR and COMMS, in accordance with certain embodiments of the present disclosure.

FIG. 22 illustrates another receiver operative characteristics (ROC) performance 2200 of the multi-user orthogonal chirp system when used for RADAR and COMMS simultaneously. The figure illustrates the performance in the case of multiple COMMS signals that co-exist with the RADAR creating severe interference to the RADAR. Severe COMMS interference degrades detection but CPI recovers it. CPI of 16 chosen in this example.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

One example embodiment of the present disclosure provides a system for multi-user communication using shared spectrum with ranging, detection, and/or relative navigation applications, the system comprising: an orthogonal chirp sequence generation circuit to generate a Fourier based orthogonal chirp sequence of length P, wherein P is a prime number selected to be greater than a desired number of users targeted for communication, the orthogonal chirp sequence based on an identification number of one of the targeted users; a signal spreading circuit to perform spreading of a message, by the orthogonal chirp sequence, to generate a spread user signal, the spread user signal directed to the one of the targeted users; and a training pulse generation circuit to generate a sequence of training pulses for insertion into the spread user signal to aid in reception of the spread user signal.

In some cases, the system further comprises at least one of a light detection and ranging (LIDAR) transmitter, and a relative navigation and ranging (RELNAV) transmitter, to transmit the spread user signal.

In some cases, the system further comprises at least one of a LIDAR receiver, a RELNAV receiver, and a radio frequency (RF) receiver to receive a reflection of the spread user signal from a platform associated with the one of the targeted users. In some such cases, the system further comprises a cross-correlation circuit to detect the platform and to calculate a range to the platform based on timing estimation of a pulse generated by cross-correlation of the spread user signal with the received reflection of the spread user signal. In some such cases, the system further comprises a coherent pulse integration circuit to improve the timing estimation of the pulse based on additional received reflections of the spread user signal over a period of time.

In some cases, the system further comprises a communications receiver to receive the message associated with the spread user signal. In some cases, the system further comprises an error coding circuit to perform at least one of convolutional coding and Reed-Solomon coding on the message. In some cases, the system further comprises a modulation circuit to perform phase shift keying modulation on the message.

In some cases, the system is configured to provide covert communications using shared spectrum for maritime applications.

Another example embodiment of the present disclosure provides a computer program product including one or more machine-readable mediums encoded with instructions that when executed by one or more processors cause a process to be carried out for receiving a ranging and detection multi-user communication signal, the process comprising: generating a Fourier based orthogonal chirp sequence of length P, wherein P is a prime number selected to be greater than a desired number of users targeted for communication, the orthogonal chirp sequence based on an identification number of one of the users targeted for communication, the one of the users associated with the system; and despreading, by the orthogonal chirp sequence, of a ranging and detection communication signal received by the system, the despreading to generate a modulated message directed to the one of the users associated with the system.

In some cases, the process further comprises the process further comprising estimating multipath effects on the ranging and detection communication signal, the channel estimation based on predetermined characteristics of training pulses included in the ranging and detection communication signal. In some such cases, the process further comprises applying a RAKE receiver to reduce the estimated multipath effects on the ranging and detection communication signal.

In some cases, the process further comprises performing phase shift keying demodulation on the modulated message to generate a demodulated message. In some such cases, the process further comprises performing at least one of convolutional error decoding and Reed-Solomon error decoding on the demodulated message.

In some cases, the ranging and detection communication signal is reflected from a platform configured to host the system. In some cases, the process further comprises receiving the ranging and detection multi-user communication signal using at least one of a LIDAR receiver, a RELNAV receiver, and a radio frequency (RF) receiver.

Another example embodiment of the present disclosure provides a computer program product including one or more machine-readable mediums encoded with instructions that when executed by one or more processors cause a process to be carried out for multi-user communication using shared spectrum with ranging, detection, and relative navigation applications, the process comprising: generating a Fourier based orthogonal chirp sequence of length P, wherein P is a prime number selected to be greater than a desired number of users targeted for communication, the orthogonal chirp sequence based on an identification number of one of the targeted users; spreading of a message, by the orthogonal chirp sequence, to generate a spread user signal, the spread user signal directed to the one of the targeted users; and generating a sequence of training pulses for insertion into the spread user signal to aid in reception of the spread user signal.

In some cases, the process further comprises transmitting the spread user signal and receiving a reflection of the spread user signal from a platform associated with the one of the targeted users, the transmitting employing at least one of a light detection and ranging (LIDAR) transmitter, and a relative navigation and ranging (RELNAV) transmitter, the receiving employing at least one of a LIDAR receiver, a RELNAV receiver, and a radio frequency (RF) receiver. In some such cases, the process further comprises detecting the platform and calculating a range to the platform based on timing estimation of a pulse generated by cross-correlation of the spread user signal with the received reflection of the spread user signal. In some such cases, the process further comprises performing coherent pulse integration on additional received reflections of the spread user signal over a period of time to improve the timing estimation of the pulse.

In some cases, the process further comprises performing at least one of convolutional error coding and Reed-Solomon error coding on the message. In some such cases, the process further comprises performing phase shift keying modulation on the message.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A system for multi-user communication using shared spectrum with ranging, detection, and/or relative navigation applications, the system comprising:
   an orthogonal chirp sequence generation circuit to generate a Fourier based orthogonal chirp sequence of length P, wherein P is a prime number selected to be greater than a desired number of users targeted for communication, the orthogonal chirp sequence based on an identification number of one of the targeted users;
   a signal spreading circuit to perform spreading of a message, by the orthogonal chirp sequence, to generate a spread user signal, the spread user signal directed to the one of the targeted users; and
   a training pulse generation circuit to generate a sequence of training pulses for insertion into the spread user signal to aid in reception of the spread user signal.

2. The system of claim 1, further comprising at least one of a light detection and ranging (LIDAR) transmitter, and a relative navigation and ranging (RELNAV) transmitter, to transmit the spread user signal.

3. The system of claim 1, further comprising at least one of a LIDAR receiver, a RELNAV receiver, and a radio frequency (RF) receiver to receive a reflection of the spread user signal from a platform associated with the one of the targeted users.

4. The system of claim 3, further comprising a cross-correlation circuit to detect the platform and to calculate a range to the platform based on timing estimation of a pulse generated by cross-correlation of the spread user signal with the received reflection of the spread user signal.

5. The system of claim 4, further comprising a coherent pulse integration circuit to improve the timing estimation of the pulse based on additional received reflections of the spread user signal over a period of time.

6. The system of claim 1, further comprising a communications receiver to receive the message associated with the spread user signal.

7. The system of claim 1, further comprising an error coding circuit to perform at least one of convolutional coding and Reed-Solomon coding on the message.

8. The system of claim 1, further comprising a modulation circuit to perform phase shift keying modulation on the message.

9. A computer program product including one or more non-transitory machine-readable mediums encoded with instructions that when executed by one or more processors cause a process to be carried out for receiving a ranging and detection multi-user communication signal, the process comprising:
   generating a Fourier based orthogonal chirp sequence of length P, wherein P is a prime number selected to be greater than a desired number of users targeted for communication, the orthogonal chirp sequence based on an identification number of one of the users targeted for communication, the one of the users associated with the system; and
   despreading, by the orthogonal chirp sequence, of a ranging and detection communication signal received by the system, the despreading to generate a modulated message directed to the one of the users associated with the system.

10. The computer program product of claim 9, the process further comprising estimating multipath effects on the ranging and detection communication signal, the channel estimation based on predetermined characteristics of training pulses included in the ranging and detection communication signal.

11. The computer program product of claim 10, the process further comprising applying a RAKE receiver to reduce the estimated multipath effects on the ranging and detection communication signal.

12. The computer program product of claim 9, the process further comprising performing phase shift keying demodulation on the modulated message to generate a demodulated message.

13. The computer program product of claim 12, the process further comprising performing at least one of convolutional error decoding and Reed-Solomon error decoding on the demodulated message.

14. The computer program product of claim 9, wherein the ranging and detection communication signal is reflected from a platform configured to host the system.

15. The computer program product of claim 9, the process further comprising receiving the ranging and detection multi-user communication signal using at least one of a LIDAR receiver, a RELNAV receiver, and a radio frequency (RF) receiver.

16. A computer program product including one or more non-transitory machine-readable mediums encoded with instructions that when executed by one or more processors cause a process to be carried out for multi-user communication using shared spectrum with ranging, detection, and relative navigation applications, the process comprising:
   generating a Fourier based orthogonal chirp sequence of length P, wherein P is a prime number selected to be greater than a desired number of users targeted for communication, the orthogonal chirp sequence based on an identification number of one of the targeted users;
   spreading of a message, by the orthogonal chirp sequence, to generate a spread user signal, the spread user signal directed to the one of the targeted users; and
   generating a sequence of training pulses for insertion into the spread user signal to aid in reception of the spread user signal.

17. The computer program product of claim 16, the process further comprising transmitting the spread user signal and receiving a reflection of the spread user signal from a platform associated with the one of the targeted users, the transmitting employing at least one of a light detection and ranging (LIDAR) transmitter, and a relative navigation and ranging (RELNAV) transmitter, the receiving employing at least one of a LIDAR receiver, a RELNAV receiver, and a radio frequency (RF) receiver.

18. The computer program product of claim 17, the process further comprising detecting the platform and calculating a range to the platform based on timing estimation of a pulse generated by cross-correlation of the spread user signal with the received reflection of the spread user signal.

19. The computer program product of claim 18, the process further comprising performing coherent pulse integration on additional received reflections of the spread user signal over a period of time to improve the timing estimation of the pulse.

20. The computer program product of claim 16, the process further comprising performing at least one of convolutional error coding and Reed-Solomon error coding on the message.

21. The computer program product of claim 16, the process further comprising performing phase shift keying modulation on the message.

* * * * *